(12) United States Patent
Harada et al.

(10) Patent No.: US 10,023,009 B2
(45) Date of Patent: Jul. 17, 2018

(54) TIRE

(75) Inventors: Takashi Harada, Yokohama (JP);
Hiroyuki Fudemoto, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 13/985,493

(22) PCT Filed: Feb. 15, 2012

(86) PCT No.: PCT/JP2012/053557
§ 371 (c)(1),
(2), (4) Date: Aug. 14, 2013

(87) PCT Pub. No.: WO2012/111719
PCT Pub. Date: Aug. 23, 2012

(65) Prior Publication Data
US 2013/0319592 A1   Dec. 5, 2013

(30) Foreign Application Priority Data

Feb. 15, 2011   (JP) .................................. 2011-030128

(51) Int. Cl.
*B60C 5/01* (2006.01)
*B60C 1/00* (2006.01)
*B60C 5/00* (2006.01)

(52) U.S. Cl.
CPC ............ *B60C 1/0041* (2013.01); *B60C 5/007* (2013.01); *B60C 5/01* (2013.01); *Y10T 152/10495* (2015.01)

(58) Field of Classification Search
CPC ............ B60C 1/00; B60C 1/0041; B60C 5/00; B60C 5/01; B60C 5/007
See application file for complete search history.

(56) References Cited

U.S. PATENT DOCUMENTS

| | | | | |
|---|---|---|---|---|
| 3,608,605 | A * | 9/1971 | Cole ...................... | B29D 30/42 152/533 |
| 3,888,291 | A * | 6/1975 | Herzlich ................ | B29D 30/06 152/209.5 |
| 3,956,546 | A * | 5/1976 | Neville .................. | B60C 9/0042 156/117 |
| 3,977,453 | A * | 8/1976 | Coran et al. ................... | 152/323 |
| 4,831,071 | A * | 5/1989 | Ward et al. ................... | 524/401 |

(Continued)

FOREIGN PATENT DOCUMENTS

| AT | 383541 | * | 7/1987 |
|---|---|---|---|
| AT | 383541 | * | 1/2008 |

(Continued)

OTHER PUBLICATIONS

Machine translation of JP 2003-104008, 2003.*

(Continued)

*Primary Examiner* — Justin R Fischer
(74) *Attorney, Agent, or Firm* — Sughrue Mion, PLLC

(57) ABSTRACT

A tire which is formed of a resin material, is highly elastic, has a low loss factor, and has excellent heat resistance and fracture characteristics. A tire 10 has a circular tire case 17 that is formed of a resin material including a polystyrene-based resin and a resin having compatibility with polystyrene and having a glass transition temperature (Tg) higher than that of polystyrene.

8 Claims, 8 Drawing Sheets

(56) References Cited

U.S. PATENT DOCUMENTS

| | | | |
|---|---|---|---|
| 6,334,919 B1 | 1/2002 | Takeyama et al. | |
| 6,376,587 B1 | 4/2002 | Ajiro et al. | |
| 6,453,960 B1* | 9/2002 | Kondo | C08J 5/24 152/451 |
| 6,706,010 B1* | 3/2004 | Miki | A61M 25/0054 604/103 |
| 7,964,286 B2* | 6/2011 | Smith | B05D 1/18 106/14.05 |
| 8,281,827 B2* | 10/2012 | Kameda et al. | 152/154.2 |
| 9,440,407 B2* | 9/2016 | Kouno | B29D 30/1628 |
| 2002/0053386 A1* | 5/2002 | Hirachi et al. | 152/529 |
| 2006/0036033 A1* | 2/2006 | Toyoshima | C08J 5/18 525/97 |
| 2006/0247378 A1 | 11/2006 | Sunkara | |
| 2006/0247380 A1 | 11/2006 | Sunkara et al. | |
| 2010/0263777 A1 | 10/2010 | Sakai et al. | |

FOREIGN PATENT DOCUMENTS

| | | |
|---|---|---|
| CN | 101171300 A | 4/2008 |
| JP | 03-143701 A | 6/1991 |
| JP | 2003-104005 A | 4/2003 |
| JP | 2003-104008 A | 4/2003 |
| JP | 2010-111817 A | 5/2010 |
| JP | 2010-188634 A | 9/2010 |
| WO | 2009/084660 A1 | 7/2009 |
| WO | 2010/095655 A1 | 8/2010 |
| WO | WO 2010/095654 * | 8/2010 |

OTHER PUBLICATIONS

International Search Report of PCT/JP2012/053557 dated Apr. 3, 2012.

Communication from the Japanese Patent Office dated Nov. 11, 2014 in a counterpart Japanese Application No. 2011-030128.

The Japan Society of Mechanical Engineers, Handbook of Mechanical Engineering Japan, May 31, 1990, B4-108.

Decision of Refusal dated Feb. 17, 2015 in corresponding Japanese Patent Application No. 2011-030128 with translation.

Office Action dated Feb. 28, 2015 in corresponding Chinese Patent Application No. 201280008910.3 with partial translation.

\* cited by examiner

TIRE

CROSS REFERENCE TO RELATED APPLICATIONS

This is a National Stage of International Application No. PCT/JP2012/053557 filed Feb. 15, 2012, claiming priority based on Japanese Patent Application No. 2011-030128 filed Feb. 15, 2011, the contents of all of which are incorporated herein by reference in their entirety.

TECHNICAL FIELD

The invention relates to a tire that is fitted on a rim, and particularly to a tire in which at least a portion is formed of a thermoplastic material.

BACKGROUND ART

Pneumatic tires constructed from rubber, organic fiber materials, steel members and the like have been conventionally used in vehicles such as passenger cars.

In recent years, from the viewpoints of weight reduction, ease of molding, and easy recyclability, investigations have been conducted on the use of resin materials, particularly thermoplastic resins, thermoplastic elastomers and the like, as tire materials.

For example, Japanese Patent Application Laid-Open (JP-A) No. 2003-104008 and JP-A No. H03-143701 disclose pneumatic tires formed using thermoplastic polymer materials, particularly polyester elastomers.

DISCLOSURE OF INVENTION

Technical Problem

Tires in which a thermoplastic polymer material is used can be easily produced and are inexpensive compared with conventional tires made of rubber. Furthermore, recently, there is a high demand for the recycling of used tires. However, since conventional tires made of rubber have crosslinked structures produced therein, recycling is difficult, and applications for recycling thereof is limited, for example, being incinerated or being used in road pavement materials after being crushed. On the other hand, tires in which a thermoplastic polymer material is used have an advantage in that the degree of freedom in applications is high even from the viewpoint of recycling. Furthermore, even in the case where tires are produced using a polymer material, from the viewpoints of energy efficiency and investment in plants and equipment, there is a high demand for productivity, such as the capability of thermal welding of materials without using an excessively high temperature.

Furthermore, when tires are produced using a thermoplastic polymer material, it is required to realize a performance (required characteristics of a tire) that is highly comparable to that of conventional rubber tires, while the production efficiency is increased, and low cost is realized. Particularly, in view of environmental problems, there is a demand for tires with low fuel consumption. Regarding the required characteristics of tires, for example, characteristics such as having an elastic modulus in a certain range, having a low mechanical loss factor (rolling coefficient: tan δ (hereinafter, may be simply referred to as "tan δ")) between 30° C. and 50° C., which is the temperature range at the time of use of tires, and having excellent heat resistance each constitute an important characteristic. However, decrease of the tan δ value and increase of the elastic modulus in a polymeric material are usually in a contradictory relationship. Accordingly, it is desired to develop a tire which can achieve a good balance between these characteristics at a high level.

Particularly in the case of a polyamide-based thermoplastic elastomer, the elastic modulus of the elastomer can be controlled by adjusting the ratio of soft segment components and hard segment components. However, in general, when it is attempted to increase the elastic modulus by adjusting the ratio of the soft segment components and the hard segment components of a polyamide-based thermoplastic elastomer, the value of tan δ at 30° C. to 50° C. also increases along with this increase in elastic modulus.

Furthermore, in the case of controlling the elastic modulus by adjusting the ratio between soft segment components and hard segment components in order to satisfy the performance that is in a contradictory relationship as described above, it is necessary to go through complicated processes in the stage of synthesis. Also, it is very difficult to synthesize a material having a sufficiently low tan δ value at a temperature in the range of 30° C. to 50° C. while having a desired elastic modulus.

The invention has been made in order to solve the problems described above, and it is an object of the invention to provide a tire which is formed using a thermoplastic polymer material, is highly elastic, and has a low loss factor and excellent productivity.

Solution to Problem (1) A tire including at least a circular tire frame formed of a resin material, the resin material including a polystyrene-based resin and a polyamide-based thermoplastic elastomer including a hard segment and a soft segment in a molecule thereof, and a tensile elastic modulus of the polyamide-based thermoplastic elastomer ($E_{PAE}$) and a tensile elastic modulus of the polystyrene-based resin ($E_{PS}$) satisfying the following formula (1):

$$E_{PAE} < E_{PS} \qquad \text{Formula (1):}$$

Since the tire of the invention includes a tire frame formed of a polyamide-based thermoplastic elastomer and a polystyrene-based resin, a vulcanization process, which is an essential process for conventional rubber tires, is not required, and the tire frame can be molded by, for example, injection molding. Furthermore, polyamide-based thermoplastic elastomers also have excellent thermal fusibility. Therefore, an enhancement of productivity such as simplification of production processes, time shortening, and cost reduction can be promoted. Furthermore, when resin materials are used in tire frames, the structure of the tire can be simplified as compared with conventional rubber tires, and as a result, weight reduction of tires can be realized. Accordingly, when resin materials are formed into tire frames, abrasion resistance and durability of tires can be enhanced.

The tire frame described above includes a polystyrene-based resin and a polyamide-based thermoplastic elastomer including a hard segment and a soft segment in the molecule thereof, and the tensile elastic modulus of the polyamide-based thermoplastic elastomer ($E_{PAE}$) and the tensile elastic modulus of the polystyrene-based resin ($E_{PS}$) satisfy the relationship of formula (1): $E_{PAE} < E_{PS}$. Here, each "tensile elastic modulus" means the tensile elastic modulus defined in JIS K7113:1995 (hereinafter, unless particularly specified herein, the "elastic modulus" as used in the present specification is to mean such tensile elastic modulus). According to the tire of the invention, mixing a polyamide-based thermoplastic elastomer and a polystyrene-based resin having a tensile elastic modulus that is higher than that of the polyamide-based thermoplastic elastomer, the elastic modulus of the tire frame can be increased while increase in the tan δ value is suppressed.

(2) The tire as described in the above item (1), wherein the resin material further includes a compatibilizing agent for the polyamide-based thermoplastic elastomer and the polystyrene-based resin (hereinafter, may be simply referred to as "compatibilizing agent").

According to the tire of the invention, when a compatibilizing agent is further added to the polyamide-based thermoplastic elastomer and the polystyrene-based resin, the interfacial tension between the polyamide-based thermoplastic elastomer and the polystyrene-based resin is decreased, and the dispersed particle size of the polystyrene-based resin can be made small. Therefore, the fracture characteristics of the tire can be enhanced, or the elastic modulus can be controlled. As the compatibilizing agent, a compound which is a resin (including a copolymer), thermoplastic elastomer or rubber that includes a molecular skeletal structure of the same kind as that of either the polyamide-based thermoplastic elastomer or the polystyrene-based resin, and has a substituent (for example, an epoxy group, a carboxyl group, an amino group or a hydroxyl group) capable of an interaction with the other, can be used.

(3) The tire as described in the above item (2), wherein the compatibilizing agent is an acid-modified polystyrene-based thermoplastic elastomer or an epoxy group-modified (meth) acrylic resin.

For example, when an acid-modified polystyrene-based thermoplastic elastomer or an epoxy group-modified (meth) acrylic resin (for example, an epoxy group-modified (meth) acrylic acid resin or an epoxy group-modified (meth)acrylic acid ester) is used, even in the case where fine adjustment of the elastic modulus of the tire frame is needed, the elastic modulus of the tire frame can be easily adjusted while an increase in the tan δ value is suppressed, as compared with the case of using a polyamide elastomer alone, and also, the fracture characteristics and the like of the tire can also be enhanced.

(4) The tire as described in any one of the above items (1) to (3), wherein the polystyrene-based resin is a polymer including a styrene molecular skeletal structure, or a copolymer of styrene and acrylonitrile.

Examples of such a resin include a PS resin and an AS resin that are described below.

(5) The tire as described in any one of the above items (1) to (4), wherein the polystyrene-based resin is an acrylonitrile/butadiene/styrene polymer or a hydrogenated product thereof; or a blend of an acrylonitrile/styrene copolymer and polybutadiene, or a hydrogenated product thereof.

Examples of such a resin include an ABS resin and an AES resin that are described below.

(6) The tire as described in any one of the above items (1) to (5), wherein the resin material further includes a styrene-based thermoplastic elastomer.

According to the tire of the invention, when a styrene-based thermoplastic elastomer is used in combination with the polyamide-based thermoplastic elastomer and the polystyrene-based resin, for example, even in the case where fine adjustment of the elastic modulus of the tire frame is needed, the elastic modulus of the tire frame can be easily adjusted while an increase in the tan δ value is suppressed, as compared with the case of using a polyamide-based thermoplastic elastomer alone.

(7) The tire as described in the above item (6), wherein the styrene-based thermoplastic elastomer is polystyrene-poly (ethylene/butylene) block-polystyrene).

Advantageous Effects of Invention

As described above, the tire of the invention is highly elastic, has a low loss factor, and has excellent productivity.

BEST MODE FOR CARRYING OUT THE INVENTION

Figure 1A:
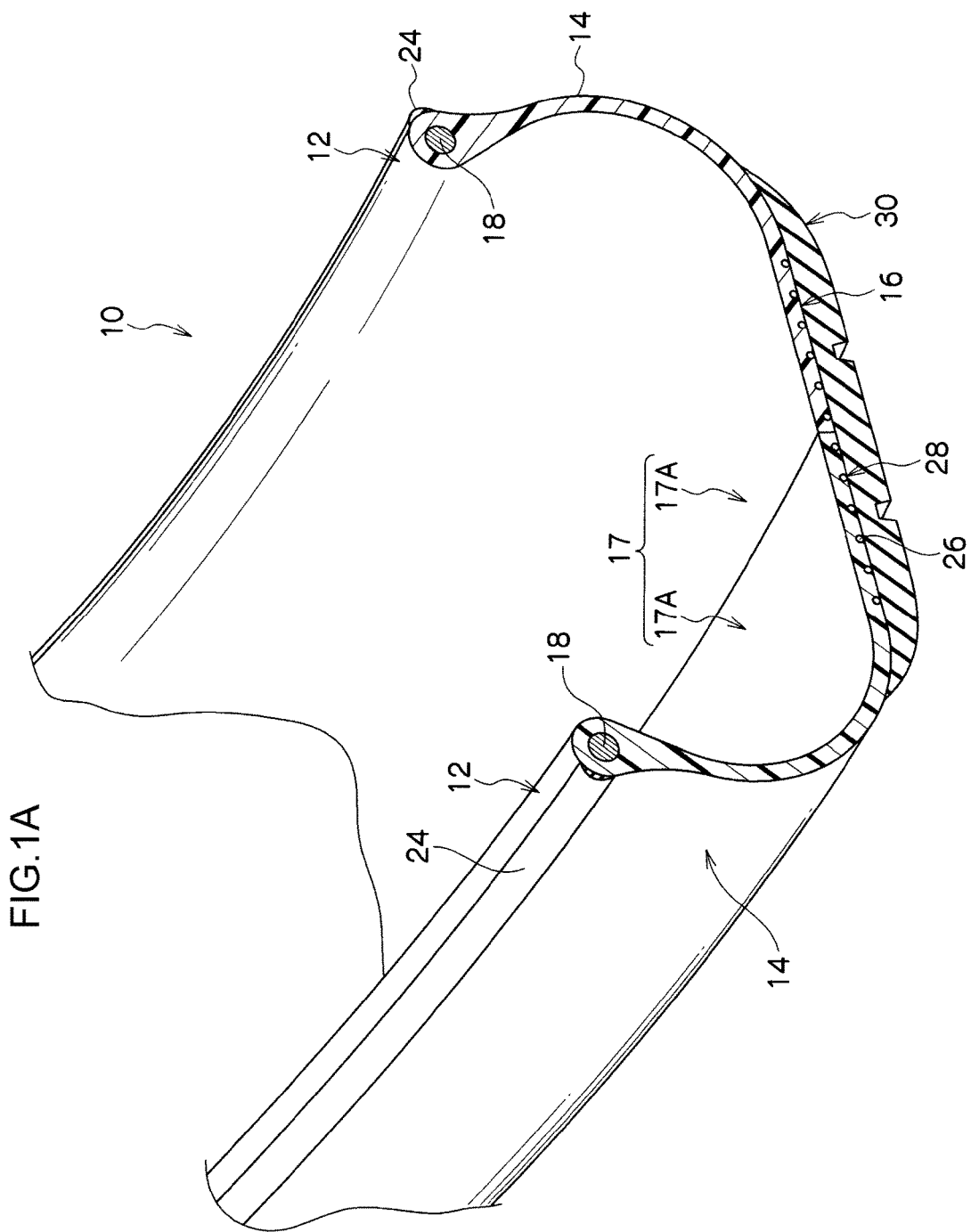
FIG. 1A is a perspective diagram illustrating the cross-section of a portion of a tire related to a first embodiment of the invention.

Hereinafter, the resin material that constitutes the tire frame according to the invention is explained, and subsequently, specific embodiments of the tire of the invention are described with reference to the drawings.

The tire of the invention is a tire which includes at least a circular tire frame formed of a resin material, in which the resin material includes a polystyrene-based resin and a polyamide-based thermoplastic elastomer including a hard segment and a soft segment in the molecule thereof, and the tensile elastic modulus of the polyamide-based thermoplastic elastomer ($E_{PAE}$) and the tensile elastic modulus of the polystyrene-based resin ($E_{PS}$) satisfy the following formula (1):

$$E_{PAE} < E_{PS} \quad \text{Formula (1):}$$

Here, the concept of the term "resin" used in the present specification encompasses thermoplastic resins and thermosetting resins, but does not encompass natural rubbers.

The term "thermoplastic elastomer" means a thermoplastic resin material formed from a copolymer having a polymer which constitutes a hard segment that is crystalline and has a high melting point or a hard segment having high cohesive force, and a polymer which constitutes a soft segment that is amorphous and has a low glass transition temperature. However, the "polystyrene-based thermoplastic elastomer" as used in the present specification also encompasses vulcanized synthetic rubbers.

Generally, in order to increase the elastic modulus of a tire formed using a thermoplastic elastomer, it is contemplated to increase the content ratio of the hard segment in the elastomer. However, when the content ratio of the hard segment is increased in order to increase the elastic modulus of a thermoplastic elastomer, the tan δ value of the thermoplastic elastomer is also increased along therewith.

The tire of the invention is such that the resin material that forms the tire frame includes a polystyrene-based resin in addition to a polyamide-based thermoplastic elastomer. Accordingly, as compared with the case where a polyamide-based thermoplastic elastomer is used singly and the ratio of the hard segment is adjusted, an increment in the elastic modulus can be easily achieved while having the tan δ value of the tire frame maintained low. Thereby, a tire having low rolling resistance and a high elastic modulus can be provided.

The mechanism by which an increase in the tan δ value can be suppressed when the elastic modulus is increased by mixing a polyamide-based thermoplastic elastomer with a polystyrene-based resin having a high elastic modulus, is not clearly known, but this is speculated to be because the polyamide-based thermoplastic elastomer and the polystyrene-based resin constitute a sea-island structure.

[Resin Material]

The resin material that constitutes the tire frame includes at least a polyamide-based thermoplastic elastomer and a polystyrene-based resin. The "same kind" as used for resin material means a situation in which, for example, both are ester-based resin materials, both are styrene-based resin materials, or the like.

(Polyamide-Based Thermoplastic Elastomer)

The term "polyamide-based thermoplastic elastomer" means a thermoplastic resin material formed from a copolymer having a polymer which constitutes a hard segment that is crystalline and has a high melting point, and a polymer which constitutes a soft segment that is amorphous and has a low glass transition temperature, the copolymer having an amide bond (—CONH—) in the main chain of the polymer that constitutes the hard segment. Examples of the polyamide-based thermoplastic elastomer include the amide-based thermoplastic elastomer (TPA) defined in JIS K6418:2007, and the polyamide-based elastomers described in JP-A No. 2004-346273.

The polyamide-based thermoplastic elastomer may be a material in which at least a polyamide constitutes the hard segment that is crystalline and has a high melting point, and another polymer (for example, a polyester or a polyether) constitutes the soft segment that is amorphous and has a low glass transition temperature. Furthermore, in the polyamide-based thermoplastic elastomer, a chain length extension agent such as a dicarboxylic acid may be used in addition to the hard segment and the soft segment. The polyamide that forms the hard segment may be, for example, a polyamide produced by a monomer represented by the following formula (1) or formula (2):

$$H_2N—R^1—COOH \qquad \text{Formula (1)}$$

In formula (1), $R^1$ represents a hydrocarbon molecular chain having from 2 to 20 carbon atoms, or an alkylene group having from 2 to 20 carbon atoms.

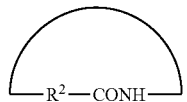

Formula (2)

In formula (2), $R^2$ represents a hydrocarbon molecular chain having from 3 to 20 carbon atoms, or an alkylene group having from 3 to 20 carbon atoms.

In formula (1), $R^1$ is preferably a hydrocarbon molecular chain having from 3 to 18 carbon atoms or an alkylene group having from 3 to 18 carbon atoms, more preferably a hydrocarbon molecular chain having from 4 to 15 carbon atoms or an alkylene group having from 4 to 15 carbon atoms, and particularly preferably a hydrocarbon molecular chain having from 10 to 15 carbon atoms or an alkylene group having from 10 to 15 carbon atoms. In formula (2), $R^2$ is preferably a hydrocarbon molecular chain having from 3 to 18 carbon atoms or an alkylene group having from 3 to 18 carbon atoms, more preferably a hydrocarbon molecular chain having from 4 to 15 carbon atoms or an alkylene group having from 4 to 15 carbon atoms, and particularly preferably a hydrocarbon molecular chain having from 10 to 15 carbon atoms or an alkylene group having from 10 to 15 carbon atoms.

Examples of the monomer represented by formula (1) or formula (2) include ω-aminocarboxylic acids and lactams. Furthermore, examples of the polyamide that forms the hard segment include polycondensates of such ω-aminocarboxylic acid or lactam, and copolycondensates of a diamine and a dicarboxylic acid.

Examples of the ω-aminocarboxylic acids include aliphatic ω-aminocarboxylic acids having from 5 to 20 carbon atoms, such as 6-aminocaproic acid, 7-aminoheptanoic acid, 8-aminooctanoic acid, 10-aminocapric acid, 11-aminoundecanoic acid, and 12-aminododecanoic acid. Examples of the lactams include aliphatic lactams having from 5 to 20 carbon atoms, such as lauryllactam, ε-caprolactam, udecanelactam, ω-enanthlactam, and 2-pyrrolidone.

Examples of the diamines include diamine compounds such as aliphatic diamines having from 2 to 20 carbon atoms, examples thereof including ethylenediamine, trimethylenediamine, tetramethylenediamine, hexamethylenediamine, heptamethylenediamine, octamethylenediamine, nonamethylenediamine, decamethylendiamine, undecamethylenediamine, dodecamethylenediamine, 2,2,4-trimethylhexamethylenediamine, 2,4,4-trimethylhexamethylenediamine, 3-methylpentamethylenediamine, and metaxylenediamine. A dicarboxylic acid may be represented by formula: HOOC—$(R^3)_m$—COOH ($R^3$: a hydrocarbon molecular chain having 3 to 20 carbon atoms, m: 0 or 1), and examples thereof include aliphatic dicarboxylic acids having 2 to 20 carbon atoms, such as oxalic acid, succinic acid, glutaric acid, adipic acid, pimelic acid, suberic acid, azelaic acid, sebacic acid, and dodecanedioic acid.

As the polyamide that forms the hard segment, a polyamide obtained by subjecting lauryllactam, ε-caprolactam or udecanelactam to ring-opening polycondensation, can be preferably used.

The polymer that forms the soft segment may be, for example, a polyester or a polyether, and examples thereof include polyethylene glycol, polypropylene glycol, polytetramethylene ether glycol, and an ABA-type triblock polyether. One of these can be used singly or two or more of these can be used in combination. Furthermore, a polyether diamine obtainable by allowing the ends of a polyether to react with ammonia or the like, can be used.

Here, the term "ABA type triblock polyether" means a polyether represented by the following formula (3):

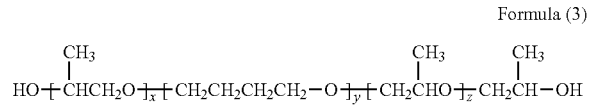

Formula (3)

In formula (3), x and z each represent an integer from 1 to 20; and y represents an integer from 4 to 50.

In formula (3), x and z are each preferably an integer from 1 to 18, more preferably an integer from 1 to 16, particularly preferably an integer from 1 to 14, and most preferably an integer from 1 to 12. Furthermore, in formula (3), y is each preferably an integer from 5 to 45, more preferably an integer from 6 to 40, particularly preferably an integer from 7 to 35, and most preferably an integer from 8 to 30.

Examples of the combination of the hard segment and the soft segment include the combinations of a hard segments and a soft segments described above, each of which is described in the above. Among these, a combination of a ring-opened polycondensate of lauryllactam/polyethylene glycol, a combination of a ring-opened polycondensate of lauryllactam/polypropylene glycol, a combination of a ring-opened polycondensate of lauryllactam/polytetramethylene ether glycol, and a combination of a ring-opened polycondensate of lauryllactam/ABA type triblock polyether are preferred, and a combination of a ring-opened polycondensate of lauryllactam/ABA type triblock polyether is particularly preferred.

The number average molecular weight of the polymer that constitutes the hard segment (polyamide) is preferably from 300 to 15,000 from the viewpoint of melt moldability. The number average molecular weight of the polymer that constitutes the soft segment is preferably from 200 to 6,000 from the viewpoints of toughness and low temperature flexibility. The mass ratio (x:y) between the hard segment (x) and the soft segment (y) is preferably from 50:50 to 90:10, and more preferably from 50:50 to 80:20, from the viewpoint of moldability.

The polyamide-based thermoplastic elastomer can be synthesized by copolymerizing a polymer that forms the hard segment and a polymer that forms the soft segment according to a known method.

Examples of the polyamide-based thermoplastic elastomer that can be used include commercially available products such as "UBESTA XPA" series of Ube Industries, Ltd. (for example, XPA9063X1, XPA9055X1, XPA9048X2, XPA9048X1, XPA9040X1, and XPA9040X2); "VESTAMID" series of Daicel-Evonik, Ltd. (for example, E40-S3, E47-S1, E47-S3, E55-S1, E55-S3, EX9200, E50-R2, E40-S4, E55-S4, and E62-S4).

—Properties of Polyamide-Based Thermoplastic Elastomer—

Regarding the polyamide-based thermoplastic elastomer, any elastomer which exhibits desired tire performance can be appropriately selected.

The elastic modulus of the polyamide-based thermoplastic elastomer ($E_{PAE}$) is preferably from 5 MPa to 700 Mpa, more preferably from 10 MPa to 500 MPa, and particularly preferably from 10 MPa to 400 MPa, from the viewpoint of the tire performance.

Similarly, the tan δ value of the polyamide-based thermoplastic elastomer is preferably from 0.01 to 0.12, more preferably from 0.01 to 0.10, and particularly preferably from 0.01 to 0.08. Here, the "loss factor (tan δ)" is a value calculated from the ratio (G"/G') between the storage shear elastic modulus (G') and the loss shear elastic modulus (G") at 30° C. and 20 Hz and at a shear strain of 1%, and it is a value indicating how much energy is absorbed (converted to heat) by a material when the material is deformed. As the value of tan δ is larger, more energy is absorbed; therefore, the rolling resistance of the tire increases, consequently causing a decrease in the fuel consumption performance of the tire. The tan δ value of a thermoplastic elastomer can be measured with a dynamic viscoelasticity measuring apparatus (Dynamic-Mechanical Analysis: DMA).

The content of the polyamide-based thermoplastic elastomer in the resin material that constitutes the tire frame is preferably from 45% to 95% by mass, more preferably from 50% to 95% by mass, and particularly preferably from 50% to 90% by mass, from the viewpoint of the elastic modulus or solvent resistance of the tire frame.

The glass transition temperature (Tg) of the polyamide-based thermoplastic elastomer is preferably from –70° C. to 100° C., and more preferably from –50° C. to 50° C., from the viewpoints of manufacturability such as handleability at the time of injection molding, and the tan δ value.

The glass transition temperature can be measured by differential scanning calorimetry (DSC).

(Polystyrene-Based Resin)

The polystyrene-based resin is a polystyrene-based resin having an elastic modulus that is higher than that of the polyamide-based thermoplastic elastomer contained in the tire frame.

Regarding the polystyrene-based resin, for example, a resin obtained by a known radical polymerization method or a known ionic polymerization method can be used suitably, and examples thereof include polystyrene having anionic living polymerization. Examples of the polystyrene-based resin include a polymer including a styrene molecular skeletal structure, and a copolymer of styrene and acrylonitrile.

Among these, an acrylonitrile/butadiene/styrene copolymer and a hydrogenated product thereof; and a blend of an acrylonitrile/styrene copolymer and polybutadiene or a hydrogenated product thereof are preferred. Specific examples of the polystyrene-based resin include polystyrene (so-called PS resin), an acrylonitrile/styrene resin (so-called AS resin), an acrylonitrile/butadiene/styrene resin (so-called ABS resin (including blend systems and copolymer systems)), and a hydrogenated product of an ABS resin (so-called AES resin), and an ABS resin, an AES resin and an AS resin are preferred, while an ABS resin and an AES resin are particularly preferred.

The "polystyrene-based resin" according to the invention is not particularly limited as long as the elastic modulus ($E_{PS}$) thereof is larger than the elastic modulus of the polyamide-based thermoplastic elastomer ($E_{PAE}$) (formula (1): $E_{PAE} < E_{PS}$). The elastic modulus of the polystyrene-based resin ($E_{PS}$) is not particularly limited as long as formula (1) is satisfied, but from the viewpoint of increasing an elastic modulus as desired while maintaining a low tan δ value, the elastic modulus of the polystyrene-based resin is preferably 700 MPa or higher, more preferably 900 MPa or higher, and particularly preferably 1000 MPa or higher. Similarly, the difference between the elastic moduli of the polyamide-based thermoplastic elastomer and the polystyrene-based resin ($E_{PS} - E_{PAE}$) is preferably 100 MPa or higher, more preferably 500 MPa or higher, and particularly preferably 700 MPa or higher.

The glass transition temperature (Tg) of the polystyrene-based resin may vary with the combination of the polyamide thermoplastic elastomer and the polystyrene-based resin used, but from the viewpoint of manufacturability (handleability) at the time of molding the tire frame, the glass transition temperature is usually preferably from −150° C. to 200° C., and more preferably from −130° C. to 150° C.

Similarly, the tan δ value of the polystyrene-based resin itself is preferably from 0.01 to 1.0, more preferably from 0.01 to 0.8, and particularly preferably from 0.01 to 0.7. The tan δ of a polystyrene-based resin can be measured with a dynamic viscoelasticity measuring apparatus (Dynamic-Mechanical Analysis: DMA).

The content of the polystyrene-based resin in the resin material that constitutes the tire frame is preferably from 5% to 55% by mass, more preferably from 5% to 50% by mass, and particularly preferably from 10% to 50% by mass, from the viewpoint of the elastic modulus and solvent resistance of the tire frame.

(Resin Material)

In the resin material including the polyamide-based thermoplastic elastomer and the polystyrene-based resin, the content ratio (x:y) of the polyamide-based thermoplastic elastomer (x) and the polystyrene-based resin (y) is not particularly limited, but from the viewpoint of the sea-island structure or from the viewpoints of solvent resistance and productivity, the content ratio is preferably from 95:5 to 10:90, more preferably from 90:10 to 30:70, and particularly preferably from 90:10 to 55:45. Particularly, when a sea-island structure of the resin material is configured such that the polyamide-based thermoplastic elastomer forms the sea phase and the polystyrene-based resin forms the island phase, it is preferable that the content of the polyamide-based thermoplastic elastomer be larger than the content of the polystyrene-based resin.

The melting point (or softening point) of the resin material (tire frame) itself is usually from 100° C. to 350° C., and preferably from about 100° C. to about 250° C., but from the viewpoint of the productivity of tire, the melting point is preferably from about 120° C. to about 250° C., and more preferably from 120° C. to 200° C. As such, when a thermoplastic resin material including a thermoplastic elastomer having a melting point of from 120° C. to 250° C. is used, for example, in the case of forming a tire frame by fusing divisions thereof (frame pieces), even in a frame fused at an ambient temperature in the range of from 120° C. to 250° C., the adhesive strength between tire frame pieces is sufficient. Therefore, the tire of the invention has excellent durability at the time of driving, such as resistance to puncture and resistance to abrasion. Meanwhile, the heating temperature is preferably a temperature higher by from 10° C. to 150° C., and more preferably a temperature higher by from 10° C. to 100° C., than the melting point (or softening point) of the thermoplastic resin material including a thermoplastic elastomer that forms tire frame pieces.

The total content of the polyamide-based thermoplastic elastomer and the polystyrene-based resin in the resin material (tire frame) in the invention is not particularly limited, but the total content is preferably 50% by mass or more, and more preferably 90% by mass or more, with respect to the total amount of the resin material. When the total content of the polyamide-based thermoplastic elastomer and the polystyrene-based resin is 50% by mass or more with respect to the total amount of the resin material, the effect of using the polyamide-based thermoplastic elastomer and the polystyrene-based resin in combination can be sufficiently exhibited. In the resin material, as desired, various additives such as rubber, other thermoplastic elastomers, thermoplastic resins, various fillers (for example, silica, calcium carbonate, and clay), aging inhibitors, oils, plasticizers, colorants, weather resistant agents, and reinforcing materials may be incorporated.

The resin material can be obtained by mixing the thermoplastic elastomer and the polystyrene-based resin, adding various additives as necessary, and appropriately mixing the components by a known method (for example, melt mixing). The thermoplastic resin material obtained by melt mixing can be used in the form of pellet as necessary.

The tensile elastic modulus (hereinafter, unless particularly specified otherwise, the "elastic modulus" in the present specification means tensile elastic modulus) as defined in JIS K7113:1995 of the resin material (tire frame) itself is preferably from 100 Mpa to 1000 Mpa, more preferably from 100 MPa to 800 MPa, and particularly preferably from 100 MPa to 700 MPa. When the tensile elastic modulus of the resin material is from 100 MPa to 700 MPa, fitting onto a rim can be efficiently carried out while the shape of the tire frame is retained.

The tensile yield strength as defined in JIS K7113:1995 of the resin material (tire frame) itself is preferably 5 MPa or more, preferably from 5 MPa to 20 MPa, and more preferably from 5 MPa to 17 MPa. When the tensile yield strength of the resin material is 5 MPa or more, it is possible to withstand deformation against the load exerted on the tire at the time of driving or the like.

The tensile yield elongation as defined in JIS K7113: 1995 of the resin material (tire frame) itself is preferably 10% or more, preferably from 10% to 70%, and more preferably from 15% to 60%. When the tensile yield elongation of the resin material is 10% or more, the elastic region is large, and fittability onto a rim can be improved.

The tensile elongation at break as defined in JIS K7113: 1995 of the resin material (tire frame) itself is preferably 50% or more, preferably 100% or more, more preferably 150% or more, and particularly preferably 200% or more. When the tensile elongation at break of the resin material is 50% or more, the fittability onto a rim is good, and it is possible to make the tire less vulnerable to breaking due to collision.

The deflection temperature under load (under a load of 0.45 MPa) as defined in ISO75-2 or ASTM D648 of the resin material (tire frame) itself is preferably 50° C. or higher, preferably from 50° C. to 150° C., and more preferably from 50° C. to 130° C. When the deflection temperature under load of the resin material is 50° C. or higher, even in the case of performing vulcanization during the production of tires, deformation of the tire frame can be suppressed.

(Compatibilizing Agent)

The resin material can include a compatibilizing agent for the polyamide-based thermoplastic elastomer and the polystyrene-based resin. When the compatibilizing agent is used in combination with the polyamide-based thermoplastic elastomer and the polystyrene-based resin, as compared with the case of using a polyamide-based thermoplastic elastomer singly, the elastic modulus can be increased while maintaining the tan δ value, and also fracture characteristics such as elongation at break can be enhanced. The mechanism by which such effects are provided is not clearly understood. However, it is speculated as follows. That is, in the sea-island structure formed by the polyamide-based thermoplastic elastomer and the polystyrene-based resin, the compatibilizing agent exists at the interface between the sea phase and the island phase, and the bonding strength between the sea phase and the island phase are enhanced, while the interfacial tension between the polyamide-based thermoplastic elastomer and the styrene-based resin is decreased, thereby making the island phase finer.

Here, the term "compatibilizing agent" means a compound which has a substituent that causes an interaction with one of the polyamide-based thermoplastic elastomer and the polystyrene-based resin in the resin material, and is capable of being intermixed with the other of the polyamide-based thermoplastic elastomer. The compatibilizing agent may be a compound having substituents which interact with the polyamide-based thermoplastic elastomer and the polystyrene-based resin respectively.

Examples of the interaction include general interactions such as interionic interaction, hydrogen bonding, dipole interaction, and van der Waals force. Examples of a substituent that causes an interaction with the polyamide thermoplastic elastomer include an epoxy group, a carboxyl group, an amino group and a hydroxyl group. Furthermore, examples of a substituent that causes an interaction with the polystyrene-based resin include a benzene group and a methylbenzene group. Regarding the compatibilizing agent, a compound which is a resin, thermoplastic elastomer or rubber that includes a molecular skeletal structure of the same kind as that of either the polyamide-based thermoplastic elastomer or the polystyrene-based resin, and has a substituent capable of an interaction with the other of the polyamide-based thermoplastic elastomer, can be used.

Examples of the compatibilizing agent that can be used include epoxy group-modified (meth)acrylic resins such as an epoxy group-modified acrylic acid resin, an epoxy group-modified methacrylic acid resin, an epoxy group-modified acrylic acid ester resin, an epoxy group-modified methacrylic acid ester resin, an epoxy group-modified acrylic acid-based thermoplastic elastomer, an epoxy group-modified acrylic acid ester-based thermoplastic elastomer, an epoxy group-modified methacrylic acid-based thermoplastic elastomer, and an epoxy group-modified methacrylic acid ester-based thermoplastic elastomer; acid-modified polystyrene-based thermoplastic elastomers, amino group-modified polystyrene-based thermoplastic elastomers, epoxy group-modified SBR, and amino group-modified SBR. Epoxy group-modified (meth)acrylic resins, acid-modified polystyrene-based thermoplastic elastomers, and amino-modified polystyrene-based thermoplastic elastomers are preferred, and epoxy group-modified (meth)acrylic resins and acid-modified polystyrene-based thermoplastic elastomers are particularly preferred.

The content of the compatibilizing agent is, from the viewpoint of having a structure in which the polyamide-based thermoplastic elastomer constitutes a sea structure, preferably from 0.1% to 50% by mass, more preferably from 0.5% to 45% by mass, and particularly preferably from 0.5% to 30% by mass, with respect to the resin material.

(Polystyrene-Based Thermoplastic Elastomer)

The resin material can further include a polystyrene-based thermoplastic elastomer. Regarding the polystyrene-based thermoplastic elastomer, any of an acid-modified polystyrene-based thermoplastic elastomer that is modified by an acid group, or an unmodified polystyrene-based thermoplastic elastomer can be used. When the acid-modified or unmodified polystyrene-based thermoplastic elastomer is used in combination with the polyamide-based thermoplastic elastomer and the polystyrene-based resin, as compared with the case of using a polyamide-based thermoplastic elastomer singly, the elastic modulus can be increased while maintaining the tan δ value, and also, fracture characteristics such as elongation at break can also be enhanced. The mechanism by which these effects are provided is not clearly understood, but it is speculated that the polystyrene-based thermoplastic elastomer has a certain effect on the sea-island structure formed by the polyamide-based thermoplastic elastomer and the polystyrene-based resin. That is, it is speculated that the acid-modified polystyrene-based thermoplastic elastomer has an effect similar to that of the compatibilizing agent described above, and enhances the bonding strength between the sea phase and the island phase by existing at the interface between the sea phase and the island phase. On the other hand, in the case of using an unmodified polystyrene-based thermoplastic elastomer, if the island phase is formed by the polystyrene-based resin, the unmodified polystyrene-based thermoplastic elastomer is prone to be remixed into the island phase. In this case, it is speculated that since the island phase is composed of the polystyrene-based thermoplastic elastomer, the elastic modulus increases; however, as the unmodified polystyrene is intermixed into the island phase, a pond phase is formed within the island phase in some occasions, thereby decreasing the elastic modulus and enhancing the fracture characteristics such as elongation at break and tensile characteristics.

The polystyrene-based thermoplastic elastomer may be a material in which at least polystyrene constitutes a hard segment, and another polymer (for example, polybutadiene, polyisoprene, polyethylene, hydrogenated polybutadiene, or hydrogenated polyisoprene) constitutes a soft segment having a low glass transition temperature. Furthermore, as the polystyrene-based thermoplastic elastomer, a synthetic rubber such as a vulcanized SBR resin may also be used.

Regarding the polystyrene that forms the hard segment, for example, a polystyrene obtainable by a known radical polymerization method or a known ionic polymerization method can be suitably used, and examples thereof include a polystyrene having anionic living polymerization. Furthermore, examples of the polymer that forms the soft segment include polybutadiene, polyisoprene, and poly(2,3-dimethyl-butadiene). Furthermore, the acid-modified polystyrene-based thermoplastic elastomer is obtained by acid-modifying an unmodified polystyrene-based thermoplastic elastomer as described below.

Examples of the combination of a hard segment and a soft segment as described above include combinations of the hard segments and the soft segments respectively described above. Among these, a combination of polystyrene/polybutadiene and a combination of polystyrene/polyisoprene are preferred. Furthermore, in order to suppress an unintended crosslinking reaction of the thermoplastic elastomer, it is preferable that the soft segment be hydrogenated.

The number average molecular weight of the polymer that constitutes the hard segment (polystyrene) is preferably from 5,000 to 500,000, and preferably from 10,000 to 200,000.

The number average molecular weight of the polymer that constitutes the soft segment is preferably from 5,000 to 1,000,000, more preferably from 10,000 to 800,000, and particularly preferably from 30,000 to 500,000. Furthermore, the volume ratio (x:y) of the hard segment (x) and the soft segment (y) is preferably from 5:95 to 80:20, and more preferably from 10:90 to 70:30, from the viewpoint of moldability.

The polystyrene-based thermoplastic elastomer can be synthesized by copolymerizing a polymer that forms the hard segment and a polymer that forms the soft segment according to a known method.

Examples of the polystyrene-based thermoplastic elastomer include styrene-butadiene-based copolymers [SBS (polystyrene-poly(butylene) block-polystyrene), SEBS (polystyrene-poly(ethylene/butylene) block-polystyrene)], styrene-isoprene copolymers (polystyrene-polyisoprene block-polystyrene), and styrene-propylene-based copolymers [SEP (polystyrene-(ethylene/propylene) block), SEPS (polystyrene-poly(ethylene/propylene) block-polystyrene), SEEPS (polystyrene-poly(ethylene-ethylene/propylene) block-polystyrene), and SEB (polystyrene (ethylene/butylene) block)], while SEBS is particularly preferred.

Examples of the unmodified polystyrene-based thermoplastic elastomer that can be used include commercially available products such as "TUFTEC" series manufactured by Asahi Kasei Chemicals Corp. (for example, H1031, H1041, H1043, H1051, H1052, H1053, H1062, H1082, H1141, H1221, and H1272); SEBS ("HYBRAR" 5127, 5125, and the like), and SEPS ("SEPTON" 2002, 2063, 52004, 52006, and the like) manufactured by Kuraray Co., Ltd.; and the like.

The content of the unmodified polystyrene-based thermoplastic elastomer is preferably smaller than the content of the polyamide-based thermoplastic elastomer, from the viewpoint of having a structure in which the polyamide-based thermoplastic elastomer is used as the sea. The content of the unmodified polystyrene-based thermoplastic elastomer is specifically preferably from 5% to 50% by mass, more preferably from 5% to 45% by mass, and particularly preferably from 5% to 30% by mass, with respect to the resin material.

—Acid-Modified Polystyrene-Based Thermoplastic Elastomer—

The "acid-modified polystyrene-based thermoplastic elastomer" means a polystyrene-based thermoplastic elastomer obtained by acid-modifying an unmodified polystyrene-based thermoplastic elastomer by bonding an unsaturated compound having an acidic group such as a carboxylic acid group, a sulfuric acid group or a phosphoric acid group, to the unmodified polystyrene-based thermoplastic elastomer. The acid-modified polystyrene-based thermoplastic elastomer can be obtained by, for example, bonding (for example, graft polymerizing) an unsaturated bonding site of an unsaturated carboxylic acid or an unsaturated carboxylic acid anhydride to a polystyrene-based thermoplastic elastomer.

The (unsaturated) compound having an acidic group is preferably a compound having a carboxylic acid group which is a weak acid group from the viewpoint of suppressing deterioration of the polyamide-based thermoplastic elastomer, and examples thereof include acrylic acid, methacrylic acid, itaconic acid, crotonic acid, isocrotonic acid, and maleic acid.

Examples of the acid-modified polystyrene-based thermoplastic elastomer include TUFTEC manufactured by Asahi Kasei Chemicals Corp., for example, M1943, M1911 and M1913; and FG19181G manufactured by Kraton Performance Polymers, Inc.

As described above, a preferred embodiment of the resin material has a sea-island structure having a sea phase which is a matrix phase composed of the polyamide-based thermoplastic elastomer, and an island phase which is a dispersed phase composed of the polystyrene-based resin described above.

Meanwhile, in regard to the sea-island structure, there is a tendency that as the acid value of the acid-modified polystyrene-based thermoplastic elastomer is higher, the island phase is smaller, and as the acid value is lower, the island phase is larger. As such, when the island phase is finely dispersed in the resin material, impact resistance is particularly enhanced. Furthermore, as acidification of the acid-modified polystyrene-based thermoplastic elastomer is higher, the interaction with the polyamide-based thermoplastic elastomer increases, and the melt viscosity of the resin material increases. When an acid-modified polystyrene-based thermoplastic elastomer and a polystyrene-based thermoplastic elastomer are used in combination, by controlling acidification, the melt viscosity of the resin material does not increase excessively, and the resin material has excellent injection moldability. Therefore, when a tire frame is produced using the resin material described above, since the resin material does not need to be heated to a high temperature, the occurrence of overheat damage of the resin material can be suppressed.

Meanwhile, the island phase of an acid-modified elastomer being finely dispersed in a thermoplastic resin can be confirmed by photographic observation using a SEM (scanning electron microscope).

The acid value of the acid-modified polystyrene-based thermoplastic elastomer is preferably more than 0 mg ($CH_3ONa$)/g but equal to or less than 20 mg ($CH_3ONa$)/g, more preferably more than 0 mg ($CH_3ONa$)/g but equal to or less than 17 mg ($CH_3ONa$)/g, and particularly preferably more than 0 mg ($CH_3ONa$)/g but equal to or less than 15 mg ($CH_3ONa$)/g.

The content of the acid-modified polystyrene-based thermoplastic elastomer is, from the viewpoint of having a structure in which the polyamide-based thermoplastic elastomer constitutes the sea, preferably smaller than the content of the polyamide-based thermoplastic elastomer. The content of the acid-modified polystyrene-based thermoplastic elastomer is specifically preferably from 5% to 50% by mass, more preferably from 5% to 40% by mass, and particularly preferably from 5% to 30% by mass with respect to the resin material.

First Embodiment

Hereinafter, the tire related to the first embodiment of the tire of the invention is described with reference to the drawings.

Figure 1B:
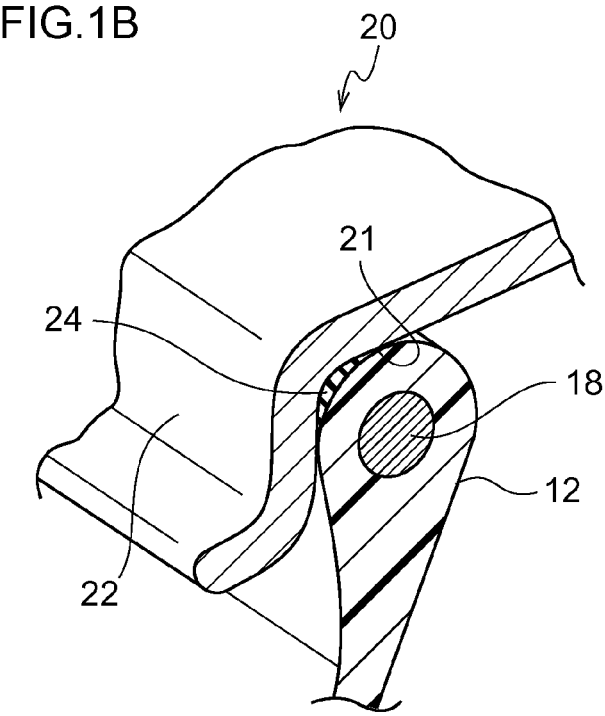
FIG. 1B is a cross-sectional diagram of a bead portion fitted onto a rim in the first embodiment of the invention.

The tire 10 of the present embodiment is described. FIG. 1(A) is a perspective diagram illustrating the cross-section of a portion of the tire related to an embodiment of the invention. FIG. 1(B) is a cross-sectional diagram of a bead portion fitted onto the rim. As shown in FIG. 1(A), the tire 10 of the present embodiment exhibits a cross-sectional shape that is approximately similar to that of a conventional general pneumatic tire made of rubber.

As shown in FIG. 1(A), the tire 10 includes a tire case 17 composed of a pair of bead portions 12 that are in contact with a bead sheet 21 and a rim flange 22 of a rim 20 shown in FIG. 1(B); side portions 14 that respectively extend outward in the direction of the tire diameter from the bead portions 12; and a crown portion 16 (outer circumference) that connects the outside end in the direction of tire diameter of one side portion 14 with the outside end in the direction of tire diameter of the other side portion 14.

Here, the tire case 17 of the present embodiment is constructed using a polyamide-based thermoplastic elastomer (for example, UBESTA, "XPA9048X1" manufactured by Ube Industries, Ltd.: elastic modulus 183 MPa) and an ABS resin (for example, "TECHNO ABS170" manufactured by Techno Polymer Co., Ltd.: elastic modulus 1373 MPa) as a styrene-based resin, and further using an unmodified SEBS (for example, "TUFTEC H1041" manufactured by Asahi Kasei Chemicals Corp.) as a styrene-based elastomer.

The tire case 17 in the present embodiment is formed of a single thermoplastic resin material (polyamide-based thermoplastic elastomer+ABS resin+unmodified SEBS), but the invention is not intended to be limited to this constitution, and similarly to conventional general pneumatic tires made of rubber, thermoplastic resin materials having different features may be respectively used in various sites (side portions 14, crown portion 16, bead portions 12, and the like) of the tire case 17. Furthermore, the tire case 17 may also be reinforced with a reinforcing material by embedding a reinforcing material (fiber, cord, non-woven fabric, woven fabric or the like made of a polymer material or a metal) in the tire case 17 (for example, bead portions 12, side portions 14, and crown portion 16).

The tire case 17 of the present embodiment is a product obtained by bonding a pair of tire case half parts (tire frame pieces) 17A formed of a resin material including a polyamide-based thermoplastic elastomer, an ABS resin, and an unmodified SEBS. The tire case half parts 17A are formed such that annular tire case half parts 17A having the same shape, each molded by injection molding or the like by integrating one bead portion 12, one side portion 14 and a half-width crown portion 16, are arranged to face each other and bonded at the equatorial plane section of the tire. Meanwhile, the tire case 17 is not limited to being formed by bonding two members, and may be formed by bonding three or more members.

The tire case half parts 17A formed from the resin material described above can be molded by, for example, vacuum molding, pressure molding, injection molding, and melt casting. Therefore, as compared with the case of molding a tire case using rubber as in conventional cases, it is not necessary to perform vulcanization, the production process can be simplified to a large extent, and the molding time can be shortened.

Furthermore, in the present embodiment, since the tire case half parts 17A have a laterally symmetric shape, that is, one tire case half part 17A and the other tire case half part 17A have the same shape, there is an advantage that only one kind of mold is needed to mold the tire case half parts 17A.

In the present embodiment, as shown in FIG. 1(B), in the bead portion 12, an annular bead core 18 formed from ofl cord is embedded, similarly to conventional general pneumatic tires. However, the invention is not intended to be limited to this configuration, and if rigidity of the bead portions 12 is secured and there is no problem in fitting with the rim 20, the bead core 18 may be omitted. Meanwhile, besides the steel cord, the bead core may be formed of an organic fiber cord, a resin-coated organic fiber cord, a hard resin or the like.

In the present embodiment, an annular sealing layer 24 formed of a material having superior sealability than the resin material that constitutes the tire case 17, for example, rubber, is formed at the section of the bead portion 12 that is brought into contact with the rim 20, or at least at the section of the rim 20 that is brought into contact with the rim flange 22. This sealing layer 24 may also be formed at the section where the tire case 17 (bead portion 12) is brought into contact with the bead sheet 21. As the material having superior sealability than the resin material that constitutes the tire case 17, a material which is softer as compared with the resin material that constitutes the tire case 17 can be used. As the rubber that can be used in the sealing layer 24, it is preferable to use a rubber of the same kind as the rubber that is used in the outer surface of the bead portion of conventional general pneumatic tires made of rubber. As long as sealability to the rim 20 can be secured using only the resin material that forms the tire case 17, the rubber sealing layer 24 may be omitted. Another thermoplastic resin (thermoplastic elastomer) having superior sealability than the resin material may be used. Examples of such another thermoplastic resin include resins such as polyurethane-based resins, polyolefin-based resins, polystyrene-based resins, and polyester resins; and blends of such resin with a rubber or elastomer. A thermoplastic elastomer can be used, and examples thereof include a polyester-based thermoplastic elastomer, a polyurethane-based thermoplastic elastomer, a polystyrene-based thermoplastic elastomer, a polyolefin-based thermoplastic elastomer, and combinations of such elastomers or blends with a rubber.

As shown FIG. 1(A), in the crown portion 16, a reinforcing cord 26 having higher rigidity than the resin material that constitutes the tire case 17 is wound in the circumferential direction of the tire case 17. The reinforcing cord 26 is wound in a helical shape while having at least a portion thereof embedded in the crown portion 16 as viewed from a cross-section cut along the axial direction of the tire case 17 to form a reinforcing cord layer 28. On the outer circumferential side in the direction of tire diameter of the reinforcing cord layer 28, a tread 30 formed of a material having superior abrasion resistance than the resin material that constitutes the tire case 17, for example, rubber, is disposed.

Figure 2:
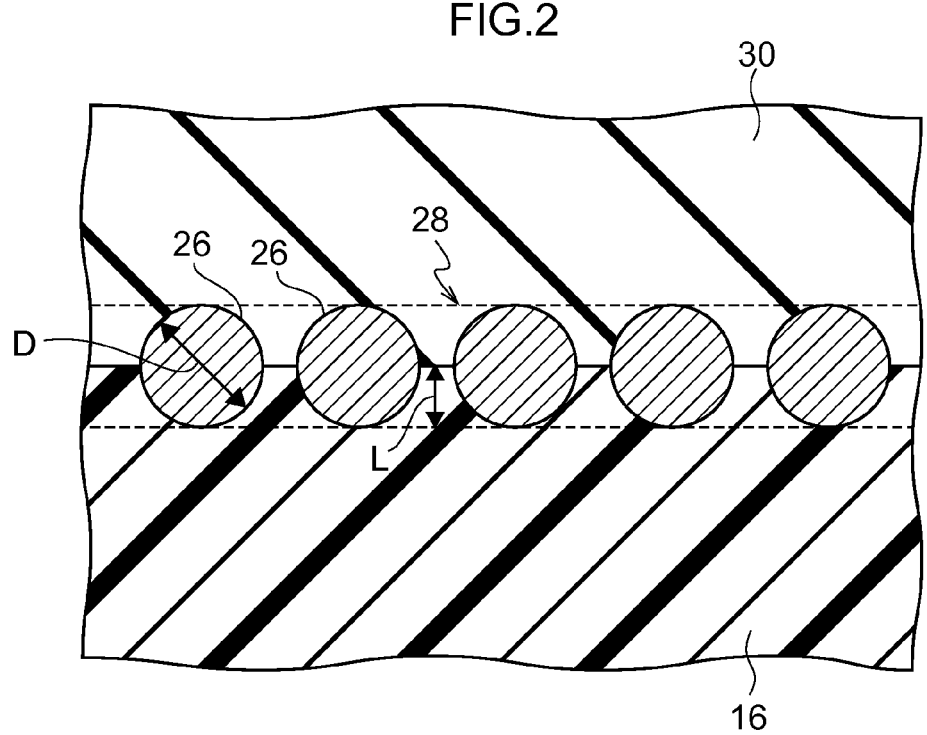
FIG. 2 is a cross-sectional diagram cut along the axis of rotation of a tire, illustrating the state in which a reinforcing cord is embedded in a crown portion of a tire case of the tire of the first embodiment.

The reinforcing cord layer 28 formed by the reinforcing cord 26 is described with reference to FIG. 2. FIG. 2 is a cross-sectional diagram cut along the axis of rotation of tire, illustrating the state in which reinforcing cord is embedded in the crown portion of the tire case of the tire of the first embodiment. As shown in FIG. 2, the reinforcing cord 26 is wound in a helical shape while having at least a portion thereof embedded in the crown portion 16 as viewed from a cross-section cut along the axial direction of the tire case 17, and together with a portion of the outer circumferential section of the tire case 17, the reinforcing cord 26 forms a reinforcing cord layer 28 as indicated with a dash line in FIG. 2. The part of the reinforcing cord 26 embedded in the crown portion 16 is in a state of being closely adhered to the resin material that constitutes the crown portion 16 (tire case 17). As the reinforcing cord 26, a monofilament (short wire) of a metal fiber or an organic fiber, a multifilament (twisted wire) produced by twisting these fibers, such as a steel cord produced by twisting steel fiber, or the like can be used. In the present embodiment, a steel cord is used as the reinforcing cord 26.

The depth L of embedding in FIG. 2 represents the depth of embedding of a reinforcing cord 26 in the direction of axis of rotation of tire in the tire case 17 (crown portion 16). The depth L of embedding of the reinforcing cord 26 in the crown portion 16 is preferably ⅕ or more, and more preferably greater than ½, of the diameter D of the reinforcing cord 26. It is most preferable that the entirety of a reinforcing cord 26 is embedded in the crown portion 16. If the depth L of embedding of the reinforcing cord 26 is greater than ½ of the diameter D of the reinforcing cord 26, it is difficult for the reinforcing cord to escape from the embedded section, in view of the dimension of the reinforcing cord 26. When the entirety of the reinforcing cord 26 is embedded in the crown portion 16, the surface (outer circumferential surface) becomes flat, and even if a member is mounted on the crown portion 16 in which the reinforcing cord 26 is embedded, incorporation of air in the surroundings of the reinforcing cord can be suppressed. The reinforcing cord layer 28 corresponds to the belt that is disposed on the outer circumferential surface of the carcass of conventional pneumatic tires made of rubber.

As explained above, the tread 30 is disposed on the outer circumference side in the direction of tire diameter of the reinforcing cord layer 28. Regarding the rubber used in this tread 30, it is preferable to use a rubber of the same kind as the rubber used in conventional pneumatic tires made of rubber. In addition, instead of the tread 30, a tread formed from another kind of thermoplastic resin material having superior abrasion resistance than the resin material that constitutes the tire case 17, may be used. On the tread 30, a tread pattern including plural grooves is formed on the surface contacting the road surface, as in the case of conventional pneumatic tires made of rubber.

Hereinafter, the method for producing a tire of the invention is described.

(Tire Case Molding Process)

First, tire case half parts each supported by a thin metal supporting ring are arranged to face each other. Next, a bonding mold, which is not shown in the diagram, is installed so as to be in contact with the outer circumferential surface of the contact portions of the tire case half parts. Here, the bonding mold is configured so as to press the periphery of the bonding section (contact portion) of the tire case half part A at a predetermined pressure. Next, the periphery of the bonding section of the tire case half parts is pressed at a temperature equal to or higher than the melting point (or softening point) of the thermoplastic resin material that constitutes the tire case. When the bonding sections of the tire case half parts are heated and pressurized by the bonding mold, the bonding section melts, the tire case half parts are fused to each other, and these members are integrated, so that the tire case 17 is formed. In the present embodiment, the bonding section of the tire case half parts was heated using a bonding mold, but the invention is not intended to be limited to this, and for example, the tire case half parts may be bonded by heating the bonding sections by means of a high frequency heater or the like provided separately, or by softening or melting the bonding sections in advance by means of hot air or irradiation of infrared radiation, and pressurizing the bonding sections by means of a bonding mold.

(Reinforcing Cord Member Winding Process)

Figure 3:
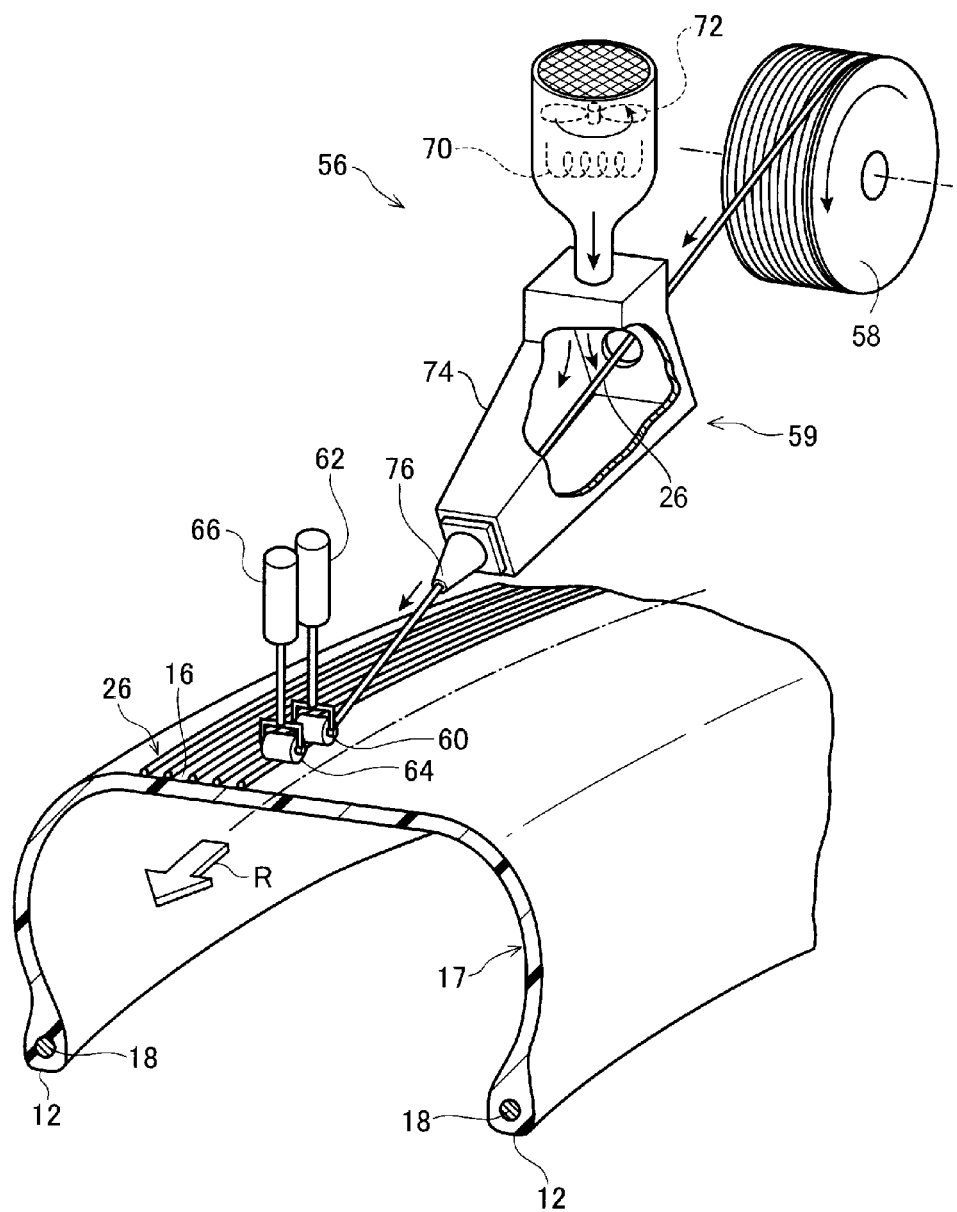
FIG. 3 is an explanatory diagram for illustrating the operation of embedding the reinforcing cord in the crown portion of the tire case using a cord heating apparatus and rollers.

Next, the reinforcing cord winding process is described with reference to FIG. 3. FIG. 3 is an explanatory diagram for illustrating the operation of embedding a reinforcing cord in the crown portion of the tire case using a cord heating device and rollers. In FIG. 3, a cord feeding apparatus 56 includes a reel 58 having a reinforcing cord 26 wound around; a cord heating device 59 disposed downstream in the cord conveyance direction of the reel 58; a first roller 60 disposed downstream in the conveyance direction of the reinforcing cord 26; a first cylinder apparatus 62 that moves in the direction of contacting and detaching the first roller 60 with respect to the outer circumferential surface of the tire; a second roller 64 disposed downstream in the reinforcing cord 26 conveyance direction of the first roller 60; and a second cylinder apparatus 66 that moves in the direction of contacting and detaching the second roller 64 with respect to the outer circumferential surface of the tire. The second roller 64 can be used as a cooling roller made of a metal. In the present embodiment, the surface of the first roller 60 or the second roller 64 is coated with a fluororesin (in the present embodiment, TEFLON (registered trademark)) in order to suppress attachment of a molten or softened resin material. In the present embodiment, the cord feeding apparatus 56 is configured to have two rollers of the first roller 60 or the second roller 64; however, the invention is not intended to be limited to this configuration, and the cord feeding apparatus 56 may be configured to have only one roller of any of them (that is, having one roller).

The cord heating device 59 includes a heater 70 and a fan 72 that generate hot air. Furthermore, the cord heating device 59 includes a heating box 74 in which the reinforcing cord 26 passes through the internal space where hot air is supplied inside; and a discharge port 76 through which a heated reinforcing cord 26 is discharged.

In the present process, first, the temperature of the heater 70 of the cord heating device 59 is raised, and the air in the surroundings heated by the heater 70 is sent to the heating box 74 by means of the wind generated by rotation of the fan 72. Subsequently, a reinforcing cord 26 that is wound off from the reel 58 is sent into the heating box 74 in which the internal space has been heated by hot air, so as to be heated (for example, the reinforcing cord 26 is heated to a temperature of from about 100° C. to about 200° C.). The heated reinforcing cord 26 passes through the discharge port 76 and is helically wound, with a certain tension, around the outer circumferential surface of the crown portion 16 of the tire case 17 that rotates in the direction of arrow R in FIG. 3. Here, when the heated reinforcing cord 26 is brought into contact with the outer circumferential surface of the crown portion 16, the resin material at the contact area melts or softens, and at least a portion of the heated reinforcing cord is embedded in the outer circumferential surface of the crown portion 16. At this time, since the heated reinforcing cord 26 is embedded in the resin material that has melted or softened, a state in which there is no gap between the resin material and the reinforcing cord 26, that is, a state in which the two members are closely adhered, is achieved. Accordingly, incorporation of air into the area where the reinforcing cord 26 is embedded is suppressed. When the reinforcing cord 26 is heated to a temperature higher than the melting point (or softening point) of the resin material of the tire case 17, melting or softening of the resin material at the area of contact with the reinforcing cord 26 is accelerated. In this manner, it becomes easy to embed reinforcing cord 26 in the outer circumferential surface of the crown portion 16, and also, incorporation of air can be effectively suppressed.

Furthermore, the depth L of embedding of the reinforcing cord 26 can be adjusted by means of the heating temperature of the reinforcing cord 26, the tension applied to the reinforcing cord 26, the pressure applied by the first roller 60, and the like. In the present embodiment, it is configured such that the depth L of embedding of the reinforcing cord 26 is ⅕ or more of the diameter D of the reinforcing cord 26. The depth L of embedding of the reinforcing cord 26 is more preferably greater than ½ of the diameter D, and it is most preferable that the entirety of the reinforcing cord 26 be embedded.

In this manner, by winding the heated reinforcing cord 26 while embedding the reinforcing cord in the outer circumferential surface of the crown portion 16, the reinforcing cord layer 28 is formed on the outer circumference side of the crown portion 16 of the tire case 17.

Next, a vulcanized band-shaped tread 30 is wound one round on the outer circumferential surface of the tire case 17, and the tread 30 is adhered to the outer circumferential surface of the tire case 17 using an adhesive or the like. As the tread 30, for example, a precure tread that is used in conventionally known retreaded tires, can be used. The present process is a process similar to the process of adhering a precure tread to the outer circumferential surface of a casing of a retreaded tire.

Then, a sealing layer 24 formed of vulcanized rubber is adhered to the bead portion 12 of the tire case 17 using an adhesive or the like, whereby the tire 10 is obtained.

(Effects)

In the tire 10 of the present embodiment, since the tire case 17 is formed by a resin material including a polyamide-based thermoplastic elastomer, an ABS resin and an unmodified SEBS, while the loss factor (tan δ) of the tire frame is maintained low, the elastic modulus is increased as compared with the case of using the polyamide-based thermoplastic elastomer alone. Therefore, the tire 10 has a decreased rolling resistance, while the elastic modulus is in the range of 100 MPa to 700 MPa. Furthermore, since the tire 10 has a simple structure as compared with conventional tires made of rubber, it has a light weight. Accordingly, the tire 10 of the present embodiment has high friction resistance and durability.

Furthermore, since the tire 10 of the present embodiment contains unmodified SEBS, as compared with the case of using only the polyamide-based thermoplastic elastomer and an ABS resin, the fracture characteristics are enhanced.

Furthermore, in the tire 10 of the present embodiment, on the outer circumferential surface of the crown portion 16 of the tire case 17 formed of the resin material, the reinforcing cord 26 having higher rigidity than the resin material is wound in a helical shape in the circumferential direction. Therefore, resistance to puncture, resistance to cutting, and rigidity in the circumferential direction of the tire 10 are enhanced. As the rigidity in the circumferential direction of the tire 10 is enhanced, creeping of the tire case 17 formed of the thermoplastic resin material is prevented.

Since the reinforcing cord 26 is at least partially embedded in the outer circumferential surface of the crown portion 16 of the tire case 17 formed of the resin material as viewed from a cross-section cut along the axial direction of the tire case 17 (cross-section shown in FIG. 1(A)), and the reinforcing cord 26 is closely adhered to the resin material, incorporation of air at the time of production is suppressed, and the reinforcing cord 26 is prevented from moving around by the input force at the time of driving or the like. Accordingly, the occurrence of detachment or the like in the reinforcing cord 26, the tire case 17, and the tread 30 is suppressed, and durability of the tire 10 is enhanced.

As such, when the reinforcing cord layer 28 is configured to include the resin material, as compared with the case of fixing the reinforcing cord 26 with a cushion rubber, the difference in hardness between the tire case 17 and the reinforcing cord layer 28 can be made small, and therefore, the reinforcing cord 26 can be further closely adhered and fixed to the tire case 17. Accordingly, the incorporation of air as described above can be effectively prevented, and the reinforcing cord members can be effectively prevented from moving around at the time of driving.

Furthermore, in the case where the reinforcing cord 26 is a steel cord, since separation and collection of reinforcing cords 26 from the resin material can be easily achieved by heating at the time of tire disposal, it is advantageous in view of the recyclability of the tire 10. Furthermore, since the resin material has a low loss factor (tan δ) as compared with vulcanized rubber, if the reinforcing cord layer 28 contains a large amount of the resin material, the rolling properties of the tire can be enhanced. Further, the resin material has an advantage that the in-plane shear rigidity is high, and the steering stability at the time of tire driving or abrasion resistance is also excellent, as compared with vulcanized rubber.

As shown in FIG. 2, since the depth L of embedding of the reinforcing cord 26 is ⅕ or greater of the diameter D, incorporation of air at the time of production is effectively suppressed, and moving around of the reinforcing cord 26 by the input force at the time of driving or the like is further suppressed.

Also, since the tread 30 that is brought into contact with the road surface is formed of a rubber material having higher abrasion resistance than the resin material that constitutes the tire case 17, abrasion resistance of the tire 10 is enhanced.

Furthermore, in the bead portion 12, since annular bead core 18 formed of a metal material is embedded, similarly to the conventional pneumatic tires made of rubber, the tire case 17, that is, the tire 10, is retained firmly with respect to the rim 20.

Furthermore, since a sealing layer 24 formed from a rubber material having higher sealability than the resin material that constitutes the tire case 17 is provided at the area where the bead portion 12 is brought into contact with the rim 20, the sealability between the tire 10 and the rim 20 is enhanced. Therefore, as compared with the case of sealing with the rim 20 and only the resin material that constitutes the tire case 17, air leakage in the tire is further suppressed. Furthermore, by providing the sealing layer 24, fittability to rim is also enhanced.

In the embodiment described above, it is configured such that the reinforcing cord 26 is heated, and the heated reinforcing cords 26 melt or soften the surface of the tire case 17 at the area that is brought into contact; however, the invention is not intended to be limited to this configuration, and it may be configured such that the outer circumferential surface of the crown portion 16 where the reinforcing cord 26 is embedded is heated using a hot air generating apparatus, without heating the reinforcing cord 26, and then the reinforcing cord 26 is embedded in the crown portion 16.

In the first embodiment, a heater and a fan are used as the heat source of the cord heating device 59; however, the invention is not intended to be limited to this configuration, and a configuration of directly heating the reinforcing cord 26 with radiant heat (for example, infrared radiation), may be employed.

In the first embodiment, a configuration in which the molten or softened area of the thermoplastic resin material in which the reinforcing cord 26 is embedded is forcibly cooled with a second roller 64 made of a metal, is employed; however, the invention is not intended to be limited to this configuration, and a configuration in which the area where the thermoplastic resin material has melted or softened is forcibly cooled and solidified by blowing cold air directly to the area where the thermoplastic resin material has melted or softened, may be employed.

In the first embodiment, a configuration of heating the reinforcing cord 26 is employed; however, for example, a configuration of coating the outer circumference of the reinforcing cord 26 with the same resin material as that of the tire case 17, may be employed. In this case, when the coated reinforcing cord is wound around the crown portion 16 of the tire case 17, incorporation of air at the time of embedding the reinforcing cord into the crown portion 16 can be effectively suppressed by heating the coated resin material together with the reinforcing cord 26.

Furthermore, it is easy in view of production to helically wind the reinforcing cord 26, but a method of winding the reinforcing cord 26 discontinuously in the width direction, or the like can be considered.

The tire 10 of the first embodiment is a so-called tubeless tire in which an air chamber is formed between the tire 10 and the rim 20 by mounting the bead portion 12 onto the rim 20. However, the invention is not intended to be limited to this configuration, and the tire may be of a complete tube shape.

Figure 4:
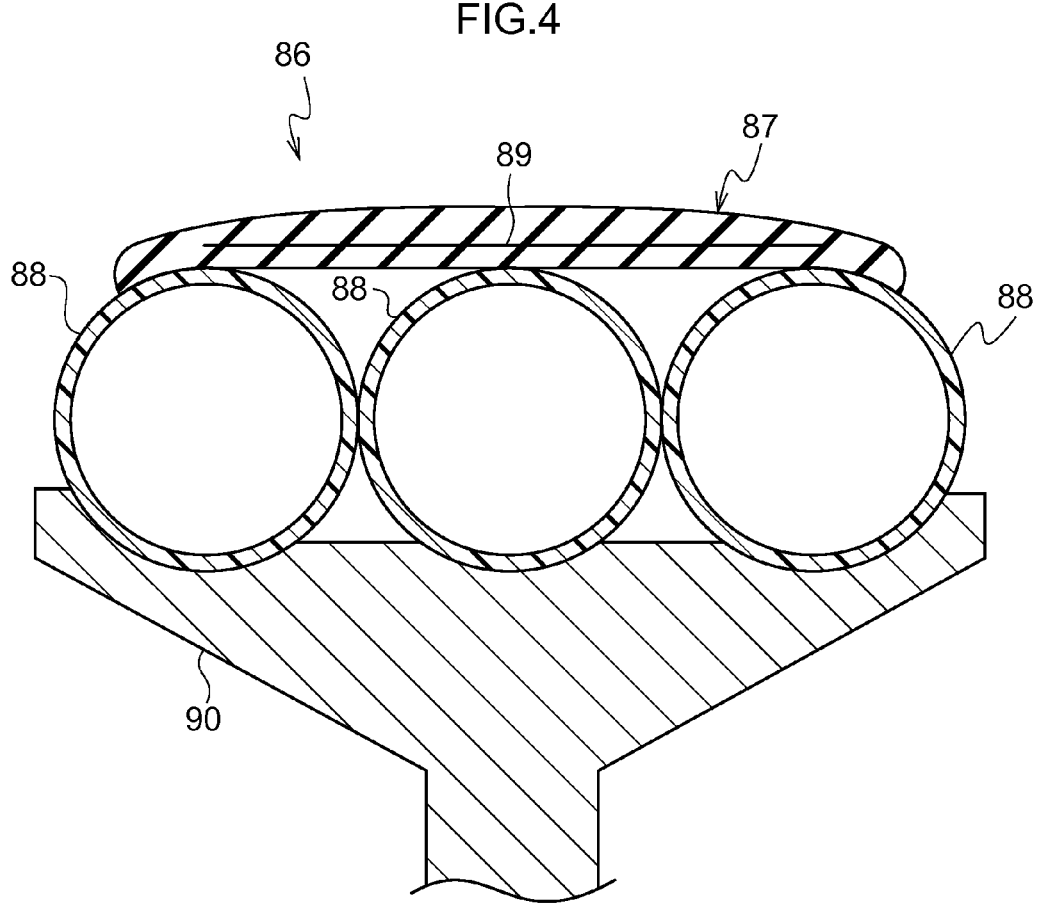
FIG. 4 is a cross-sectional diagram of a tire related to another embodiment.

Regarding the tire of a complete tube shape, as shown in FIG. 4, an embodiment in which three annular tire frames are disposed in the tire width direction may be employed. FIG. 4 is a cross-sectional diagram of a tire according to another embodiment. As shown in FIG. 4, a tire 86 includes a tread rubber layer 87; annular hollow tubes (tire frames) 88 formed of the same resin material as that used in the first embodiment; a belt (reinforcing cords) 89; and a rim 90. The tubes 88 are disposed such that three pieces are disposed in parallel in the tire width direction of the tire 86. On the outer circumferential sections of the tubes 88, the tread rubber layer 87 in which the belt 89 is embedded is adhered. Furthermore, the tubes 88 are mounted on the rim 90 that has concave sections that engage with the tubes 88. This tire 86 is not provided with a bead core.

Second Embodiment

Figure 5A:
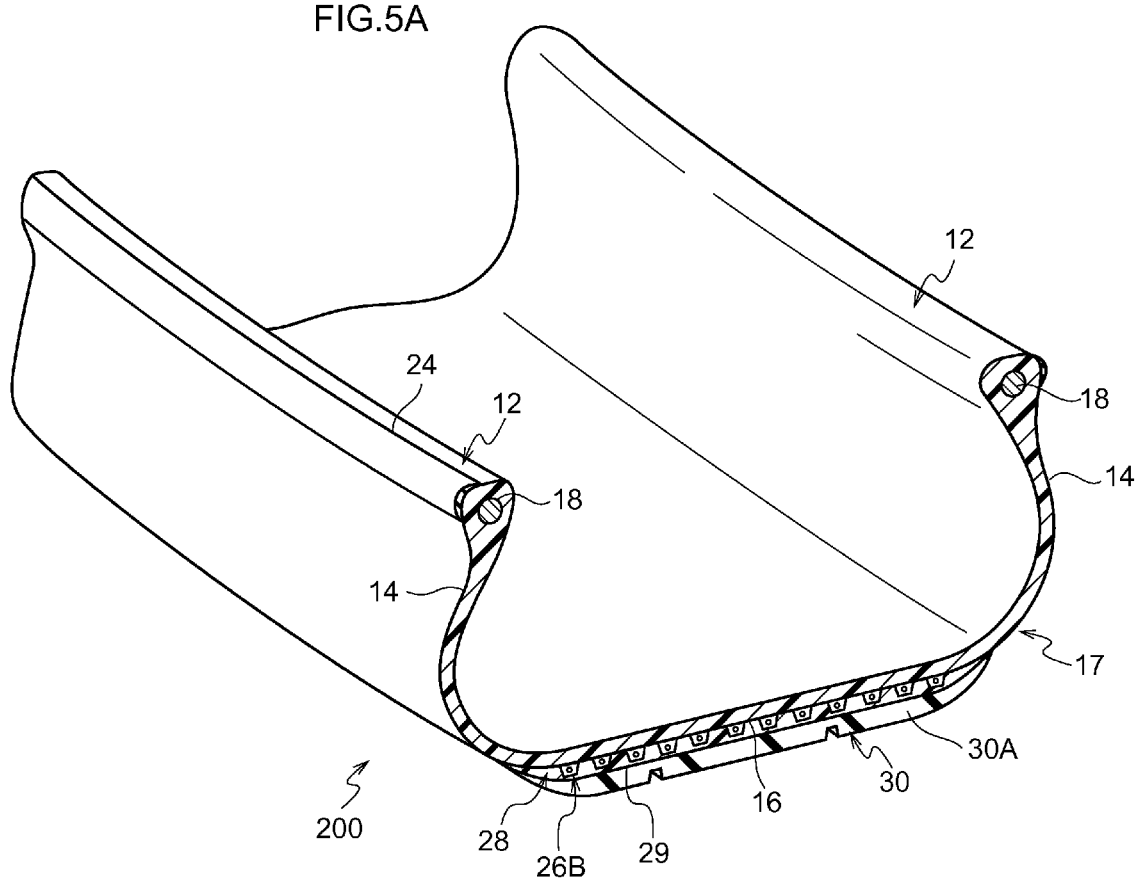
FIG. 5A is a perspective diagram illustrating the cross-section of a portion of a tire related to a second embodiment of the invention.
Figure 5B:
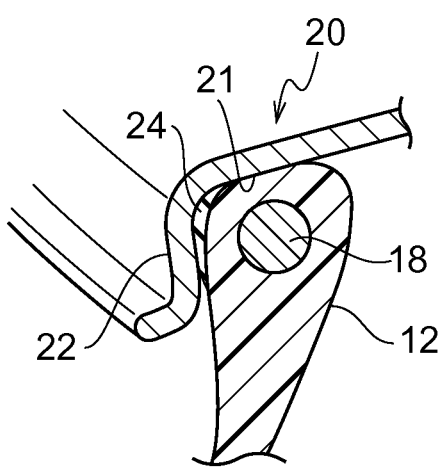
FIG. 5B is a cross-sectional diagram of a bead portion mounted on the rim in the second embodiment of the invention.
Figure 6:
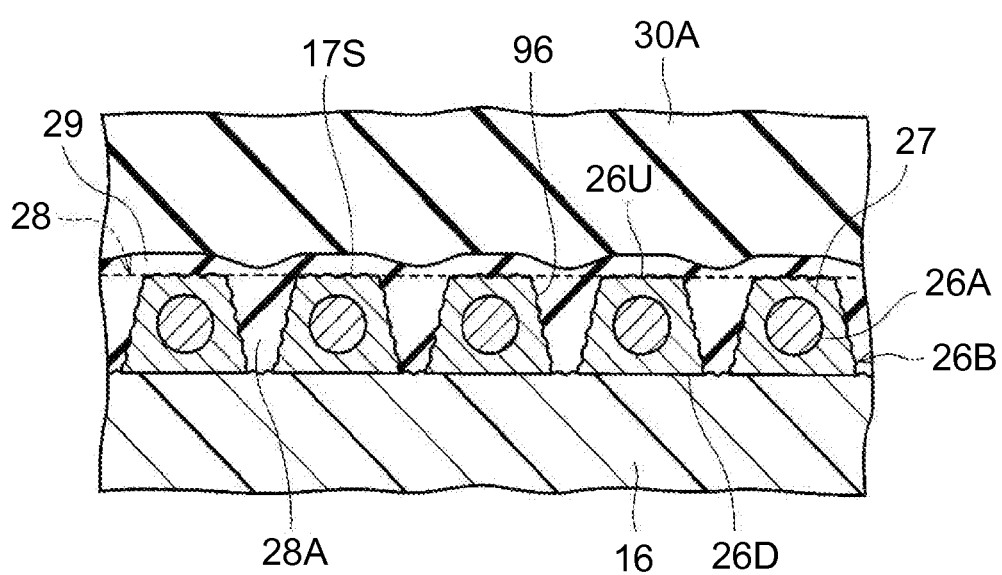
FIG. 6 is a cross-sectional diagram cut along the tire width direction, showing the surroundings of a reinforcing layer of the tire of the second embodiment.

Next, the method for producing a tire of the invention and a second embodiment of the tire are described with reference to the drawings. The tire of the present embodiment shows approximately the same cross-sectional shape as that of conventional general pneumatic tires made of rubber, similarly to the first embodiment described above. Therefore, in the following drawings, the same reference numerals will be assigned to the same configurations as those of the first embodiment. FIG. 5(A) is a cross-sectional diagram of the tire of the second embodiment cut along the tire width direction, and FIG. 5(B) is a magnified diagram of the cross-section cut along the tire width direction of the bead portion in a state in which the rim is engaged with the tire of the second embodiment. FIG. 6 is a cross-sectional diagram cut along the tire width direction showing the vicinity of the reinforcing layer of the tire of the second embodiment.

The tire of the second embodiment is configured such that, similarly to the first embodiment described above, the tire case 17 is formed using a polyamide-based thermoplastic elastomer (for example, manufactured by Ube Industries, Ltd., UBESTA "XPA9048X1": elastic modulus 183 MPa) and an ABS resin (for example, manufactured by Techno Polymer Co., Ltd., "TECHNO ABS130": elastic modulus 1853 MPa), and as a compatibilizing agent, an acid-modified polystyrene-based thermoplastic elastomer (for example, "TUFTEC M1913" manufactured by Asahi Kasei Chemicals Corp.).

In a tire 200 according to the present embodiment, as shown in FIG. 5(A) and FIG. 6, a reinforcing cord layer 28 in which coated cord members 26B are wound in the circumferential direction (indicated by a dash line in FIG. 6) is superposed on a crown portion 16. This reinforcing cord layer 28 constitutes the outer circumference of the tire case 17, and reinforces the rigidity in the circumferential direction of the crown portion 16. Meanwhile, the outer circumferential surface of the reinforcing cord layer 28 is included in an outer circumferential surface 17S of the tire case 17.

This coated cord member 26B is formed by coating a cord member 26A having higher rigidity than the resin material that forms the tire case 17, with a resin material for coating 27 that is physically different from the resin material that forms the tire case 17. Furthermore, the coated cord member 26B is such that the coated cord member 26B and the crown portion 16 are bonded (for example, welded or adhered with an adhesive) at the contact area with the crown portion 16.

The elastic modulus of the resin material for coating 27 is preferably set to the range of 0.1 times to 10 times the elastic modulus of the resin material that forms the tire case 17. When the elastic modulus of the resin material for coating 27 is 10 times or less of the elastic modulus of the thermoplastic resin material that forms the tire case 17, the crown portion does not become excessively hard, and the fittability onto a rim becomes easy. Furthermore, when the elastic modulus of the resin material for coating 27 is 0.1 times or more of the elastic modulus of the thermoplastic resin material that forms the tire case 17, the resin that constitutes the reinforcing cord layer 28 is not excessively soft, and has excellent in-plane shear rigidity of the belt, so that the cornering power is enhanced. Meanwhile, in the present embodiment, the same material as the resin material that forms the tire frame is used as the resin material for coating 27.

As shown in FIG. 6, the coated cord member 26B is such that the cross-sectional shape is a substantially trapezoidal shape. Meanwhile, in the following description, the upper surface of the coated cord member 26B (the outer surface in the tire radial direction) is indicated by reference symbol 26U, and the lower surface (the inner surface in the tire radial direction) is indicted by reference symbol 26D. Furthermore, in the second embodiment, it is configured such that the cross-sectional shape of the coated cord member 26B is made into a substantially trapezoidal shape; however, the invention is not intended to be limited to this configuration, and any shape except for a shape in which the cross-sectional shape becomes broader in width from the lower surface 26D side (inner side in the tire radial direction) toward the upper surface 26U side (outer side in the tire radial direction), may be used.

As shown in FIG. 6, since the coated cord members 26B are arranged at an interval in the circumferential direction, gaps 28A are formed between adjacent coated cord members 26B. Therefore, the outer circumferential surface of the reinforcing cord layer 28 has irregularities, and the outer circumferential surface 17S of the tire case 17 in which this reinforcing cord layer 28 constitutes the outer circumference also has unevenness.

On the outer circumferential surface 17S (including unevenness) of the tire case 17, finely roughened unevenness are uniformly formed, and a cushion rubber 29 is bonded thereon by means of an adhesive. In regard to this cushion rubber 29, the rubber part on the inner side in the radial direction has flowed into the roughened unevenness.

Furthermore, a tread 30 formed from a material having superior abrasion resistance than that of the resin material that forms the tire case 17, for example, rubber, is bonded to the top (outer circumferential surface) of the cushion rubber 29.

For the rubber used in the tread 30 (tread rubber 30A), a rubber of the same kind as that of the rubber used in the conventional pneumatic tires made of rubber is preferably used. Instead of the tread 30, a tread formed of a resin material of another kind and having superior abrasion resistance than that of the resin material that forms the tire case 17 may be used. In the tread 30, a tread pattern (not shown in the diagram) having plural grooves is formed on the surface contacting the road surface, similarly to the conventional pneumatic tires made of rubber.

Next, the method for producing a tire of the present embodiment is described.

(Frame Forming Process)

First, tire case half parts 17A are formed in the same manner as in the first embodiment described above, and these are heated and pressed by means of a bonding mold, to form a tire case 17.

(Reinforcing Cord Member Winding Process)

Regarding the tire producing apparatus according to the present embodiment, similarly to the first embodiment described above, the cord feeding apparatus 56 shown in FIG. 3 of the first embodiment described above, in which a coated cord member 26B having a substantially trapezoidal cross-sectional shape that is obtained by coating a cord member 26A with a resin material for coating 27 (the same resin material as that of the tire case in the present embodiment), is wound around a reel 58, is used.

First, the temperature of a heater 70 is increased, and thus the ambient air that has been heated by the heater 70 is sent to a heating box 74 by means of the wind generated by rotation of a fan 72. The coated cord member 26B that is wound off from the reel 58 is sent into the heating box 74 in which the internal space has been heated by hot air, so as to be heated (for example, the temperature at the outer circumferential surface of the coated cord member 26B is adjusted to a temperature equal to or higher than the melting point (or softening point) of the resin material for coating 27). Here, as the coated cord member 26B is heated, the resin material for coating 27 is brought to a state of being melted or softened.

The coated cord member 26B passes through a discharge port 76 and is wound in a helical shape, with a certain tension, around the outer circumferential surface of the crown portion 16 of the tire case 17 that rotates in the direction coming out from the paper. At this time, the lower surface 26D of the coated cord member 26B is brought into contact with the outer circumferential surface of the crown portion 16. The resin material for coating 27 that is in a molten or softened state at the contact area spreads over the outer circumferential surface of the crown portion 16, and the coated cord member 26B is welded to the outer circumferential surface of the crown portion 16. Accordingly, the bonding strength between the crown portion 16 and the coated cord member 26B is enhanced.

(Roughening Treatment Process)

Next, in the blasting apparatus that is not shown in the drawings, a blasting abrasive is shot to the outer circumferential surface 17S of the tire case 17 at a high speed while the tire case 17 is rotated. The blasting abrasive that has been injected out collides with the outer circumferential surface 17S, and forms finely roughened unevenness 96 having an arithmetic mean roughness Ra of 0.05 mm or larger on this outer circumferential surface 17S.

When finely roughened unevenness 96 are formed on the outer circumferential surface 17S of the tire case 17 in this manner, the outer circumferential surface 17S becomes hydrophilic, and the wettability of the bonding agent that will be described below is enhanced.

(Superposition Process)

Next, a bonding agent is applied on the outer circumferential surface 17S of the tire case 17 that has been subjected to a roughening treatment.

In addition, examples of the bonding agent include a triazinethiol-based adhesive, a chlorinated rubber-based adhesive, a phenolic resin adhesive, an isocyanate-based adhesive, a halogenated rubber-based adhesive and a rubber-based adhesive, and there are no particular limitations.

However, a bonding agent that reacts at a temperature at which the cushion rubber 29 can be vulcanized (90° C. to 140° C.) is preferred.

Next, a cushion rubber 29 in an unvulcanized state is wound one round on the outer circumferential surface 17S where the bonding agent has been applied, and on that cushion rubber 29, for example, a bonding agent such as a rubber cement composition is applied. A tread rubber 30A that is in a vulcanized or semi-vulcanized state is wound one round thereon, and thus a tire case in a raw state is obtained.

(Vulcanization Process)

Next, the raw tire case is accommodated in a vulcanizing can or mold and is subjected to vulcanization. At this time, an unvulcanized cushion rubber 29 flows into the roughened unevenness 96 that have been formed on the outer circumferential surface 17S of the tire case 17 by the roughening treatment. When vulcanization is completed, an anchor effect is exhibited by the cushion rubber 29 that has flown into the roughened unevenness 96, and the bonding strength between the tire case 17 and the cushion rubber 29 is enhanced. That is, the bonding strength between the tire case 17 and the tread 30 is enhanced by means of the cushion rubber 29.

Then, a sealing layer 24 formed of a soft material which is softer than the resin material is adhered using an adhesive or the like to the bead portion 12 of the tire case 17, and thus the tire 200 is completed.

(Effects)

In the tire 200 of the present embodiment, since the tire case 17 is formed of a resin material including a polyamide-based thermoplastic elastomer, an ABS resin and an acid-modified SEBS, the tire has an increased elastic modulus as compared with the case of using the polyamide-based thermoplastic elastomer alone, while having the loss factor (tan δ) of the tire frame maintained low. Therefore, the tire 200 has an elastic modulus in the range of 100 MPa to 700 MPa, and has reduced rolling resistance. Furthermore, since the tire 200 has a simple structure as compared with the conventional rubber tires, the tire has a light weight. Accordingly, the tire 200 of the present embodiment has high friction resistance and durability.

Furthermore, in the tire 200 of the present embodiment, since an acid-modified SEBS is contained, the fracture characteristics are enhanced as compared with the case of using the polyamide-based thermoplastic elastomer and the ABS resin only.

In the method for producing a tire of the present embodiment, on the occasion of integrating the tire case 17, the cushion rubber 29 and the tread rubber 30A, since the outer circumferential surface 17S of the tire case 17 has been subjected to a roughening treatment, bondability (adhesiveness) is enhanced by an anchor effect. Furthermore, since the resin material that forms the tire case 17 is dug up by collision of the blasting abrasive, wettability of the bonding agent is enhanced. Accordingly, the bonding agent is maintained in a uniformly applied state on the outer circumferential surface 17S of the tire case 17, and the bonding strength between the tire case 17 and the cushion rubber 92 can be secured.

Particularly, even if unevenness are formed on the outer circumferential surface 17S of the tire case 17, a roughening treatment in the vicinity of concave areas (dented wall and dented bottom) is achieved by colliding a projection material with concave areas (gaps 28A), and the bonding strength between the tire case 17 and the cushion rubber 29 can be secured.

On the other hand, since the cushion rubber 29 is superposed in a region subjected to a roughening treatment of the outer circumferential surface 17S of the tire case 17, the bonding strength between the tire case 17 and the cushion rubber can be effectively secured.

In the vulcanization process, when the cushion rubber 29 is vulcanized, the cushion rubber 29 flows into the roughened unevenness formed on the outer circumferential surface 17S of the tire case 17 by a roughening treatment. Then, when vulcanization is completed, an anchor effect is exhibited by the cushion rubber 29 that has flown into the roughened unevenness, and the bonding strength between the tire case 17 and the cushion rubber 29 is enhanced.

Such a tire 200 produced by the method for producing a tire has secured bonding strength between the tire case 17 and the cushion rubber 29. That is, the bonding strength between the tire case 17 and the tread 30 is secured by means of the cushion rubber 29. Thereby, detachment between the outer circumferential surface 17S of the tire case 17 of the tire 200 and the cushion rubber 29 is suppressed at the time of driving or the like.

Furthermore, since the reinforcing cord layer 28 constitute the outer circumference of the tire case 17, resistance to puncture and resistance to cutting are enhanced as compared with the case where the a member other than the reinforcing cord layer 28 constitutes the outer circumference of the tire case.

Furthermore, since the reinforcing cord layer 28 is formed by winding the coated cord member 26B, the rigidity in the circumferential direction of the tire 200 is enhanced. As the rigidity in the circumferential direction is increased, creeping (a phenomenon in which plastic deformation of the tire case 17 increases with time under a constant stress) in the tire case 17 is suppressed, and pressure resistance against the air pressure from the inner side in the tire radial direction is enhanced.

Furthermore, when the reinforcing cord layer 28 is configured to include the coated cord member 26B, as compared with the case of fixing the reinforcing cords 26A with the cushion rubber 29 only, since the difference in hardness between the tire case 17 and the reinforcing cord layer 28 can be made small, the coated cord member 26B can be further closely adhered and fixed to the tire case 17. Accordingly, the incorporation of air described above can be effectively prevented, and the reinforcing cord member can be effectively prevented from moving around at the time of driving.

Furthermore, when the reinforcing cords 26A is a steel cord, since separation and collection of the cord members 26A from the coated cord members 26B can be easily achieved by heating at the time of tire disposal, it is advantageous in view of recyclability of the tire 200. Furthermore, since the resin material has a lower loss factor (tan δ) compared with vulcanized rubber, when the reinforcing cord layer 28 contains a large amount of the resin material, the rolling properties of the tire can be enhanced. Furthermore, the resin material has an advantage that the in-plane shear rigidity is large, and steering stability and abrasion resistance at the time of tire driving are also excellent, as compared with vulcanized rubber.

The present embodiment is configured to have unevenness formed on the outer circumferential surface 17S of the tire case 17; however, the invention is not intended to be limited to this, and a configuration in which the outer circumferential surface 17S is formed in a flat manner may be employed.

Furthermore, in the tire case 17, a reinforcing cord layer may be formed such that the coated cord member that is wound around the crown portion of the tire case and bonded thereto is covered with a thermoplastic material for coating. In this case, a coating layer can be formed by discharging a thermoplastic material for coating in a molten or softened state, onto the reinforcing cord layer 28. Furthermore, a coating layer may be formed by heating a welding sheet into a molten or softened state, without using an extruder, and attaching the welding sheet onto the surface (outer circumferential surface) of the reinforcing cord layer 28.

In the second embodiment described above, it is configured such that the tire case 17 is formed by bonding case half parts (tire case half parts 17A). However, the invention is not intended to be limited to this configuration, and the tire case 17 may be integrally formed using a mold or the like.

The tire 200 of the second embodiment is a so-called tubeless tire in which an air chamber is formed between the tire 200 and the rim 20 by mounting a bead portion 12 onto the rim 20. However, the invention is not intended to be limited to this configuration, and the tire 200 may have, for example, a complete tube shape (for example, the shape shown in FIG. 4).

In the second embodiment, the cushion rubber 29 is disposed between the tire case 17 and the tread 30; however, the invention is not intended to be limited to this, and a configuration in which the cushion rubber 29 is not disposed may be employed.

Furthermore, the second embodiment is configured such that the coated cord members 26B are wound in a helical shape on the crown portion 16; however, the invention is not intended to be limited to this, and a configuration in which the coated cord members 26B are wound discontinuously in the width direction may be employed.

The second embodiment is configured such that the resin material for coating 27 that forms the coated cord member 26B is a thermoplastic material, this resin material for coating 27 is brought to a molten or softened state by heating, and the coated cord member 26B is welded onto the outer circumferential surface of the crown portion 16. However, the invention is not intended to be limited to this configuration, and a configuration in which the coated cord member 26B is adhered to the outer circumferential surface of the crown portion 16 using an adhesive or the like without heating the resin material for coating 27, may be employed.

Furthermore, a configuration in which a thermosetting resin is used as the resin material for coating 27 that forms the coated cord member 26B, and the coated cord member 26B is adhered to the outer circumferential surface of the crown portion 16 using an adhesive or the like without heating the coated cord members 26B, may be employed.

Moreover, a configuration in which a thermosetting resin is used as the resin material for coating 27 that forms the coated cord member 26B, and the tire case 17 is formed of a thermoplastic resin material, may be employed. In this case, the coated cord member 26B may be adhered to the outer circumferential surface of the crown portion 16 using an adhesive or the like, or the site where the coated cord member 26B is disposed in the tire case 17 may be heated to a molten or softened state, and the coated cord members 26B may be welded to the outer circumferential surface of the crown portion 16.

Further, a configuration in which a thermoplastic material is used as the resin material for coating 27 that forms the coated cord member 26B, and the tire case 17 is formed of a thermoplastic resin material, may be employed. In this case, the coated cord member 26B may be adhered to the outer circumferential surface of the crown portion 16 using an adhesive or the like, or the resin material for coating 27 may be heated to a molten or softened state while the site where the coated cord member 26B is disposed in the tire case 17 is heated to a molten or softened state, and the coated cord member 26B may be welded to the outer circumferential surface of the crown portion 16. Meanwhile, when both the tire case 17 and the coated cord member 26B are heated to a molten or softened state, since the two members are mixed thoroughly with each other, the bonding strength is enhanced. When thermoplastic resin materials are used for both the resin material that forms the tire case 17 and the resin material for coating 27 that forms the coated cord member 26B, it is preferable to use thermoplastic materials of the same kind, particularly the same thermoplastic material.

Furthermore, the adhesive may be applied after activating the surface of the outer circumferential surface 17S by further subjecting the outer circumferential surface 17S of the tire case 17 that has been subjected to a roughening treatment, to a corona treatment, a plasma treatment or the like, and thereby increasing hydrophilicity.

Furthermore, the procedure for producing the tire 200 is not intended to be limited to the procedure of the second embodiment, and may be appropriately modified.

Thus, embodiments of the invention have been described by way of exemplary embodiments, but these embodiments are only examples, and various modifications can be made to the extent that the gist of the invention is maintained. Furthermore, it is needless to say that the scope of rights of the invention is not intended to be limited to these embodiments.

Furthermore, the tire of the invention can be configured as follows, as disclosed in the first embodiment.

(1-1) The tire of the invention can be configured such that at least a portion of the reinforcing cord member is embedded in the outer circumference of a tire frame formed of a thermoplastic resin material, as viewed from a cross-section cut along the axial direction of the tire frame.

As such, when a portion of the reinforcing cord member is embedded in the outer circumference of the tire frame, the phenomenon in which air remains in a region around the cord at the time of winding the reinforcing cord members (incorporation of air) can be further suppressed. When incorporation of air into a region around the reinforcing cord member is suppressed, the reinforcing cord member is prevented from moving around by the input force or the like at the time of driving. Accordingly, for example, when a tire constituting member is provided on the outer circumference of the tire frame so as to cover the entirety of the reinforcing cord member, since the movement of the reinforcing cord member is suppressed, the occurrence of detachment or the like between these members (including the tire frame) is suppressed, and durability is enhanced.

(1-2) The tire of the invention may be provided with a tread that is formed of a material having higher abrasion resistance than the thermoplastic resin material described above, on the outer side in the radial direction of the reinforcing cord layer.

As such, when the tread that is brought into contact with the road surface is formed of a material having higher abrasion resistance than the thermoplastic resin material, abrasion resistance of the tire can be further enhanced.

(1-3) In the tire of the invention, the reinforcing cord members can be embedded in the outer circumference of the tire frame along the circumferential direction, to a depth of ⅕ or more of the diameter of the reinforcing cord member as viewed from a cross-section cut along the axial direction of the tire frame.

As such, when the reinforcing cord member is embedded in the outer circumference of the tire frame to a depth of ⅕ or more of the diameter of the reinforcing cord member as viewed from a cross-section cut along the axial direction of the tire frame, incorporation of air into the region around the reinforcing cord member can be effectively suppressed, and the movement of the reinforcing cord member due to the input force at the time of driving can be further suppressed.

(1-4) The tire can be configured such that the tire frame has a bead portion that is brought into contact with a bead sheet and a rim flange of the rim on the inner side in the diameter direction, and an annular bead core formed of a metal material is embedded in the bead portion.

As such, when a bead portion which is a part for fitting onto the rim in the tire frame is provided, and an annular bead core formed of a metal material is embedded in this bead portion, the tire frame (that is, tire) can be firmly held on the rim, similarly to the conventional pneumatic tires made of rubber.

(1-5) The tire the invention can be provided with a sealing portion formed of a material having higher sealability (adhesiveness to the rim) than the thermoplastic resin material at the area where the bead portion is brought into contact with the rim.

As such, when the sealing portion formed of a material having higher sealability than the thermoplastic resin material is provided at the contact area between the tire frame and the rim, the adhesiveness between the tire (tire frame) and the rim can be enhanced. Accordingly, as compared with the case where only a rim and a thermoplastic resin material are used, leakage of air in the tire can be further suppressed. Furthermore, the fittability to the rim of the tire can also be enhanced by providing the sealing portion.

(1-6) The tire of the invention can be produced according to a production method which includes a tire frame piece forming process of forming a tire frame piece that constitutes a portion of a circular tire frame, using at least the thermoplastic resin material described above; a tire frame piece bonding step of forming the tire frame by fusing two or more of the tire frame pieces, which make a pair, by applying heat to bonding surfaces of the tire frame pieces; and a reinforcing cord member winding process of winding a reinforcing cord member around the outer circumferential direction of the tire frame in the circumferential direction to form a reinforcing cord layer.

(1-7) The production method described above can be configured such that in the tire frame piece bonding process, the bonding surface of the tire frame piece is heated to a temperature equal to or higher than the melting point (or softening point) (for example, melting point (or softening point)+10° C. to +150° C.) of the resin material that constitutes the tire frame piece.

As such, when the bonding surface of the division is heated to a temperature equal to or higher than the melting point (or softening point) of the resin material that constitutes the tire frame piece, fusion between the tire frame pieces can be sufficiently achieved. Therefore, productivity of the tire can be increased, while durability of the tire is enhanced.

(1-8) The method for producing a tire can be configured such that, in the reinforcing cord member winding process, the reinforcing cord member is wound around the outer circumference of the tire frame that has been formed in the tire frame bonding process, in such a manner that at least a portion of the reinforcing cord member is embedded while the outer circumference of the tire frame is melted or softened.

As such, when the reinforcing cord member is wound around the outer circumference of the tire frame in such a manner that at least a portion of the reinforcing cord member is embedded while the outer circumference of the tire frame is melted or softened, at least the portions of the reinforcing cord member that have been embedded can be welded to the thermoplastic resin material that has melted or softened. Accordingly, incorporation of air between the outer circumference of the tire frame and the reinforcing cord member as viewed from a cross-section cut along the axial direction of the tire frame can be further suppressed. Also, when the area where the reinforcing cord member is embedded is cooled and solidified, the fixing condition of the reinforcing cord member embedded in the tire frame is enhanced.

(1-9) The method for producing a tire can be configured such that in the reinforcing cord member winding step, the reinforcing cord is embedded in the outer circumference of the tire frame to a depth of ⅕ or more of the diameter of the reinforcing cord as viewed from a cross-section cut along the axial direction of the tire frame.

As such, when the reinforcing members are embedded in the outer circumference of the tire frame to a depth of ⅕ or more as viewed from a cross-section cut along the axial direction of the tire frame, incorporation of air into a region around the reinforcing cords at the time of production can be effectively suppressed, and it can be made for the embedded reinforcing cord members to be not easily pulled out from the tire frame.

(1-10) The method for producing a tire can be configured such that in the reinforcing cord member winding process, the heated reinforcing cord member is embedded in the tire frame.

As such, in the reinforcing cord member winding process, if the reinforcing cord member is embedded in the tire frame while heating the reinforcing cord members, when the heated reinforcing cord member is brought into contact with the outer circumference of the tire frame, the contact area is melted or softened, and therefore, it becomes easy to embed the reinforcing cord members in the outer circumference of the tire frame.

(1-11) The method for producing a tire can be configured such in the cord member winding process, the area of the outer circumference of the tire frame where the reinforcing cord member is embedded is heated.

As such, when the area of the outer circumference of the tire frame where the reinforcing cord member is embedded is heated, the heated area of the tire frame melts or softens, and therefore, it becomes easy to embed the reinforcing cord member.

(1-12) The method for producing a tire can be configured such that in the cord member winding process, the reinforcing cord member is wound in a helical shape in the circumferential direction of the outer circumference of the tire frame, while the reinforcing cord member is pressed onto the outer circumference of the tire frame.

As such, when the reinforcing cord member is wound in a helical shape while the reinforcing cord member is pressed onto the outer circumference of the tire frame, the depth of embedding of the reinforcing cord members into the outer circumference of the tire frame can be adjusted.

(1-13) According to the production method described above, it can be configured such that in the cord member winding process, after the reinforcing cord member is wound around the tire frame, the molten or softened area of the outer circumference of the tire frame is cooled.

As such, when the molten or softened area of the outer circumference of the tire frame is forcibly cooled after the reinforcing cord member is embedded, the molten or softened area of the outer circumference of the tire frame can be more rapidly cooled and solidified than in the case of natural cooling. By cooling the tire outer circumference more rapidly than in the case of natural cooling, deformation of the outer circumference of the tire frame can be suppressed, and also, the reinforcing cord member can be prevented from moving around.

Furthermore, the tire of the invention can be configured as follows, as described in the second embodiment.

(2-1) The tire of the invention can be configured such that the production method described above further includes a roughening treatment process of roughening the outer circumferential surface of the tire frame by causing a particle-shaped blasting abrasive to collide with the outer circumferential surface of the tire frame; and a superposition process of superposing a tire constituting rubber member on the outer circumferential surface that has been subjected to a roughening treatment, by means of an adhesive.

As such, when a roughening treatment process is provided, a particle-shaped blasting abrasive collides with the outer circumferential surface of the circular tire frame formed using the thermoplastic resin material described above, and finely roughened unevenness are formed on the outer circumferential surface. Meanwhile, the treatment of causing a particle-shaped blasting abrasive to collide with the outer circumferential surface of the tire frame and thereby forming finely roughened unevenness is referred to as a roughening treatment. Thereafter, a tire constituting rubber member is superposed on the roughened outer circumferential surface by means of an adhesive. Here, on the occasion of integrating the tire frame and the tire constituting rubber member, since the outer circumferential surface of the tire frame has been subjected to a roughening treatment, bondability (adhesiveness) is enhanced by an anchor effect. Furthermore, since the resin material that forms the tire frame is dug up by collision of the blasting abrasive, wettability of the outer circumferential surface is enhanced. Thereby, the bonding agent is maintained in a uniformly applied state on the outer circumferential surface of the tire frame, and thus, the bonding strength between the tire frame and the tire constituting rubber member can be secured.

(2-2) The tire of the invention is such that at least a portion of the outer circumferential surface of the tire frame is an irregular portion, and the irregular portion can be produced by applying a roughening treatment in the roughening treatment process. As such, even if at least a portion of the outer circumferential surface of the tire frame is configured to be an irregular portion, a roughening treatment is achieved in the vicinity of concave sections (dented wall and dented bottom) by causing a blast abrasive to collide with the uneven portion, and thereby, the bonding strength between the tire frame and the tire constituting rubber member can be secured.

(2-3) In the tire of the invention, the outer circumference of the tire frame is configured to include a reinforcing layer that constitutes the uneven portion on the outer circumferential surface, and the reinforcing layer can be configured such that a coated cord member produced by coating a reinforcing cord with a resin material of the same kind as or different from the resin material that forms the tire frame, are wound in the circumferential direction of the tire frame.

As such, when the outer circumference of the tire frame is configured to include a reinforcing layer produced by winding a coated cord member in the circumferential direction of the tire frame, the rigidity in the circumferential direction of the tire frame can be enhanced.

(2-4) In the tire of the invention, a thermoplastic resin material can be used for the resin material that constitutes the coated cord members.

As such, when a thermoplastic material having thermoplasticity is used for the resin material that constitutes the coated cord member, as compared with the case of using a thermosetting material as the resin material, tire production is made easy, and it is made easy to recycle the tire.

(2-5) The tire of the invention can be configured such that in the roughening treatment process, a region which is broader than the region for superposing the tire constituting rubber member is subjected to a roughening treatment.

As such, when a roughening treatment is applied to a region broader than the region for superposing the tire constituting rubber member in the roughening treatment process, the bonding strength between the tire frame and the tire constituting rubber member can be reliably secured.

(2-6) The tire of the invention can be configured such that the outer circumferential surface is subjected to a roughening treatment to obtain an arithmetic mean roughness Ra of 0.05 mm or larger in the roughening treatment process.

As such, when the outer circumferential surface of the tire frame is subjected to a roughening treatment in the roughening treatment process so as to obtain an arithmetic mean roughness Ra of 0.05 mm or greater, in the case where, for example, a tire constituting rubber member in an unvulcanized or semivulcanized state is superposed on the roughening treated outer circumferential surface by means of an adhesive and is vulcanized, the rubber of the tire constituting rubber member can be caused to flow into the bottom of the roughened unevenness formed by the roughening treatment. When rubber of the tire constituting rubber member is caused to flow into the bottom of the roughened unevenness, a sufficient anchor effect is exhibited between the outer circumferential surface and the tire constituting rubber member, and the bonding strength between the tire frame and the tire constituting rubber member can be increased.

(2-7) In the tire of the invention, rubber in an unvulcanized or semivulcanized state can be used as the tire constituting rubber member.

As such, if a rubber in an unvulcanized or semivulcanized state is used as the tire constituting rubber member, when the tire constituting rubber member is vulcanized, the rubber flows into the roughened unevenness that has been formed on the outer circumferential surface of the tire frame by the roughening treatment. Then, when vulcanization is completed, an anchor effect is exhibited by the rubber (in a vulcanized state) that has flown into the roughened unevenness, and the bonding strength between the tire frame and the tire constituting rubber members can be increased.

Meanwhile, the vulcanized state means a state in which the degree of vulcanization has reached the degree required for final products, and the semivulcanized state means a state in which the degree of vulcanization is higher than that of an unvulcanized state, but the degree of vulcanization has not reached the degree required for final products.

(2-8) The tire of the invention can be configured to include a circular tire frame that is formed using the resin material described above and has its outer circumferential surface that has been subjected to a roughening treatment by causing a particle-shaped blast abrasive to collide with the outer circumferential surface; and a tire constituting rubber member that is superposed on the outer circumferential surface that has been subjected to the roughening treatment, by means of a bonding agent.

As such, when a circular tire frame that has been subjected to a roughening treatment is used, the bonding strength between the tire frame and the tire constituting rubber member can be increased by an anchor effect. Furthermore, since the outer circumferential surface has been subjected to a roughening treatment, wettability of the bonding agent is good. Accordingly, the bonding agent is maintained in a uniformly applied state on the outer circumferential surface of the tire frame, and the bonding strength between the tire frame and the tire constituting rubber member is secured, so that detachment between the tire frame and the tire constituting rubber member can be suppressed.

Thus, embodiments of the invention have been described by way of exemplary embodiments, but these embodiments are only examples, and various modifications can be made to the extent that the gist of the invention is maintained. Furthermore, it is needless to say that the scope of rights of the invention is not intended to be limited to these embodiments.

EXAMPLES

Hereinafter, the invention will be more specifically described by way of Examples. However, the invention is not intended to be limited to these.

First, tires of Examples and Comparative Examples were formed according to the second embodiment described above. At this time, the materials described in the following Tables 1 to 6 were used as the materials for forming tire cases. Also, for each of the respective Examples and Comparative Examples, evaluations of the material properties and an evaluation of tire performance were carried out.

[Production of Pellet]

For the resin materials used in the tire cases in the Examples and Comparative Examples, materials were mixed at the compositions (mass basis) indicated in Tables 1 to 6. Subsequently, the resin materials were respectively kneaded (mixing temperature: 180° C. to 200° C.) in a "LABOPLASTOMILL 50MR" twin-screw extruder manufactured by Toyo Seiki Seisaku-sho, Ltd., whereby pellets were obtained. In some Comparative Examples, mixed systems were not used, and pellets of polyamide-based thermoplastic elastomers were prepared.

<Evaluation of Tensile Strength, Elongation at Break, Tensile Elastic Modulus, and Loss Factor (tan δ)>

Injection molding was carried out using the pellets thus produced and using SE30D manufactured by Sumitomo Heavy Industries, Ltd., under the conditions of a molding temperature of 215° C. to 225° C. and a mold temperature of 50° C., and thus samples each having a size of 12.7 mm×127 mm and a thickness of 1.6 mm were obtained.

The samples were punched, and thus, dumbbell-shaped specimens (No. 5 specimens) as defined in JIS K6251:1993 were produced.

Subsequently, the tensile strength, elongation at break, and tensile elastic modulus at 23° C. of each of the dumbbell-shaped specimens were measured using a Shimadzu Autograph AGS-J (5 KN) manufactured by Shimadzu Corp. and by setting the tensile speed at 200 mm/min. The tensile strength and elongation at break were used as indices of the evaluation of fracture characteristics of the tires.

Regarding the loss factor (tan δ), tan δ was measured using ARES III manufactured by Rheometric Scientific, Inc. under the conditions of 30° C., 20 Hz, and a shear strain of 1%. The results are presented in Table 1.

Figure 7:
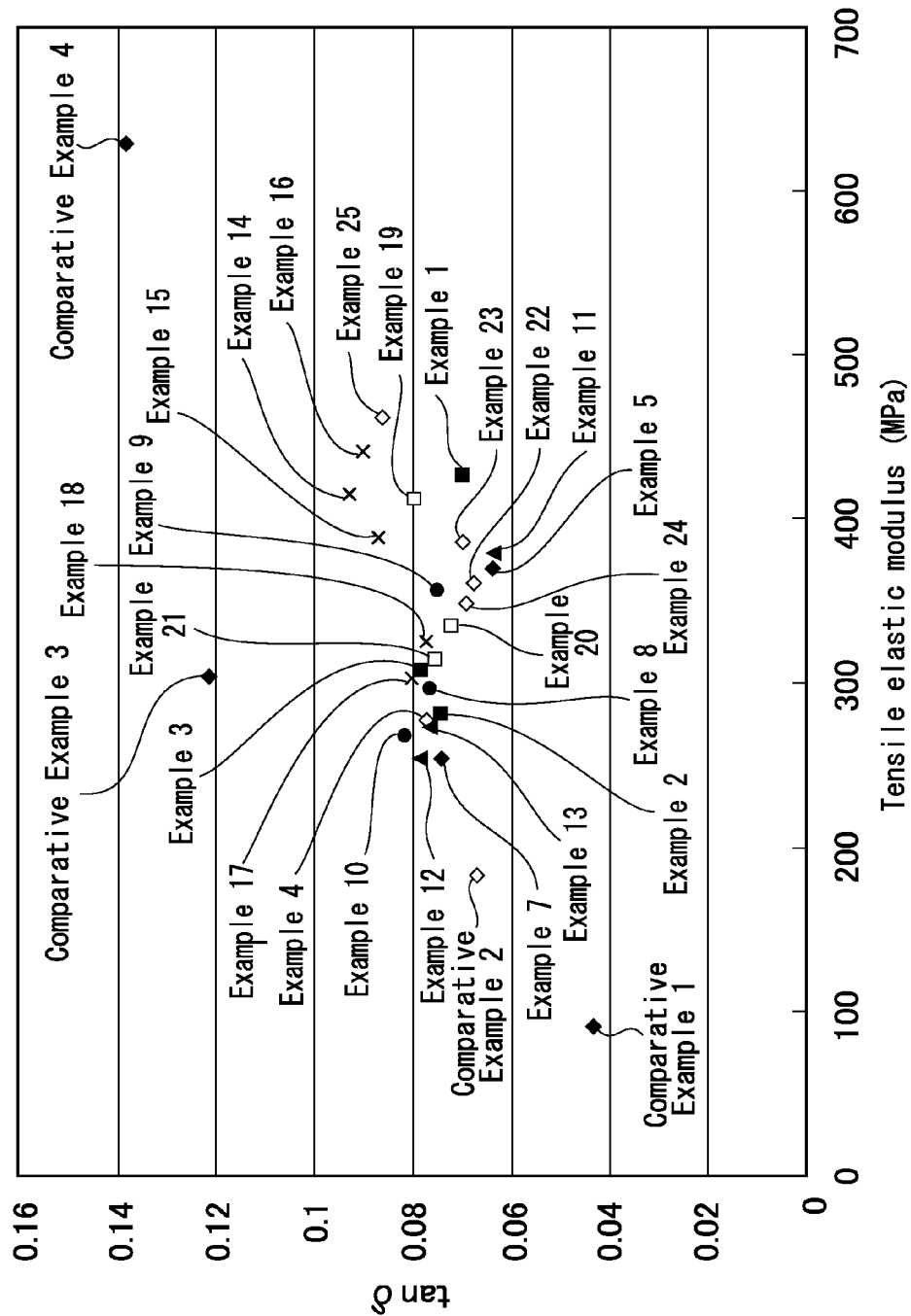
FIG. 7 is a graph illustrating the relationship between the elastic modulus and tan δ in Examples and Comparative Examples.

Furthermore, for the Examples and Comparative Examples, the relationship between the elastic modulus and tan δ is shown in FIG. 7. FIG. 7 is a graph illustrating the relationship between the elastic modulus and tan δ in various Examples and Comparative Examples.

TABLE 1

|  |  |  | Comparative Example 1 | Comparative Example 2 | Comparative Example 3 | Comparative Example 4 |
|---|---|---|---|---|---|---|
| Polyamide elastomer | UBESTA | XPA9040X1 | 100 | — | — | — |
|  |  | XPA9048X1 | — | 100 | — | — |
|  |  | XPA9055X1 | — | — | 100 | — |
|  |  | XPA9063X1 | — | — | — | 100 |
| Results |  | Tensile strength (MPa) | 27 | 32 | 41 | 44 |
|  |  | Elongation at break (%) | 610 | 400 | 350 | 250 |
|  |  | Tensile elastic modulus (MPa) | 91 | 183 | 303 | 626 |
|  |  | tan δ | 0.044 | 0.067 | 0.121 | 0.138 |

TABLE 2

|  |  |  | Example 1 | Example 2 | Example 3 | Example 4 | Example 5 | Example 6 | Example 7 | Example 8 |
|---|---|---|---|---|---|---|---|---|---|---|
| Polyamide elastomer | UBESTA | XPA9048X1 | 70 | 70 | 70 | 85 | 70 | 55 | 70 | 70 |
| Styrene-based resin | TECHNO ABS | ABS130 | 30 | 15 | 15 | — | — | — | — | — |
|  |  | ABS170 | — | — | — | 15 | 30 | 45 | 15 | 15 |
| Styrene-based elastomer (SEBS) | TUFTEC | M1913 | — | 15 | — | — | — | — | 15 | — |
|  |  | H1041 | — | — | 15 | — | — | — | — | 15 |
| Results |  | Tensile strength (MPa) | 16 | 32 | 32 | 28 | 19 | 17 | 33 | 30 |
|  |  | Elongation at break (%) | 280 | 345 | 570 | 445 | 350 | 170 | 355 | 560 |
|  |  | Tensile elastic modulus (MPa) | 426 | 280 | 307 | 276 | 369 | >500 | 252 | 296 |
|  |  | tan δ | 0.07 | 0.074 | 0.078 | 0.077 | 0.064 | 0.081 | 0.074 | 0.076 |

TABLE 3

|  |  |  | Example 9 | Example 10 | Example 11 | Example 12 | Example 13 |
|---|---|---|---|---|---|---|---|
| Polyamide elastomer | UBESTA | XPA9048X1 | 70 | 70 | 70 | 70 | 70 |
| Styrene-based resin | TECHNO ABS | W245 | 30 | 20 | — | — | — |
|  | EXCELLOY | TK10 | — | — | 30 | 15 | 15 |
| Styrene-based elastomer (SEBS) | TUFTEC | M1913 | — | 10 | — | 15 | — |
|  |  | H1041 | — | — | — | — | 15 |
| Results |  | Tensile strength (MPa) | 17 | 28 | 21 | 32 | 33 |
|  |  | Elongation at break (%) | 335 | 365 | 330 | 360 | 570 |
|  |  | Tensile elastic modulus (MPa) | 355 | 268 | 378 | 254 | 273 |
|  |  | tan δ | 0.075 | 0.081 | 0.064 | 0.078 | 0.076 |

TABLE 4

|  |  |  | Example 14 | Example 15 |
|---|---|---|---|---|
| Polyamide elastomer | UBESTA | XPA9048X1 | 70 | 70 |
| Styrene-based resin | PSJ-polystyrene | PS 680 | 30 | 15 |
| Styrene-based elastomer (SEBS) | TUFTEC | M1913 | — | 15 |
| Results |  | Tensile strength (MPa) | 17 | 32 |
|  |  | Elongation at break (%) | 250 | 360 |
|  |  | Tensile elastic modulus (MPa) | 414 | 388 |
|  |  | tan δ | 0.093 | 0.087 |

Descriptions of abbreviations in the tables are shown below.

Polyamide Elastomer

UBESTA "XPA9040X1" manufactured by Ube Industries, Ltd. (elastic modulus: 91 MPa)

UBESTA "XPA9048X1" manufactured by Ube Industries, Ltd. (elastic modulus: 183 MPa)

UBESTA "XPA9055X1" manufactured by Ube Industries, Ltd. (elastic modulus: 303 MPa)

UBESTA "XPA9063X1" manufactured by Ube Industries, Ltd. (elastic modulus: 626 MPa)

Polystyrene-Based Resin

TECHNO ABS "ABS130" manufactured by Techno Polymer Co., Ltd. (ABS resin: elastic modulus 1853 MPa)

TECHNO ABS "ABS170" manufactured by Techno Polymer Co., Ltd. (ABS resin: elastic modulus 1373 MPa)

TABLE 5

|  |  |  | Example 16 | Example 17 | Example 18 | Example 19 | Example 20 | Example 21 |
|---|---|---|---|---|---|---|---|---|
| Polyamide elastomer | UBESTA | XPA9048X1 | 70 | 70 | 70 | 70 | 70 | 70 |
| Styrene-based resin | STYLAC AS | T8707 769 | 30 | 15 | 15 | — | — | — |
|  |  |  | — | — | — | 30 | 15 | 15 |
| Styrene-based elastomer (SEBS) | TUFTEC | M1913 H1041 | — | 15 | — | — | 15 | — |
|  |  |  | — | — | 15 | — | — | 15 |
| Results |  | Tensile strength (MPa) | 16 | 33 | 32 | 16 | 30 | 33 |
|  |  | Elongation at break (%) | 270 | 355 | 600 | 275 | 350 | 600 |
|  |  | Tensile elastic modulus (MPa) | 440 | 304 | 325 | 411 | 334 | 313 |
|  |  | tan δ | 0.09 | 0.08 | 0.077 | 0.08 | 0.072 | 0.075 |

TABLE 6

|  |  |  | Example 22 | Example 23 | Example 24 | Example 25 |
|---|---|---|---|---|---|---|
| Polyamide elastomer | UBESTA | XPA9048X1 | 70 | 70 | 70 | 70 |
| Styrene-based resin | TECHNO ABS | ABS170 | 30 | 30 | — | — |
|  | TECHNO AES | W245 | — | — | 30 | — |
|  | STYLAC AS | 769 | — | — | — | 30 |
| Compatibilizing agent | RESEDA | GP-301 | 1 | 3 | 3 | 3 |
| Results |  | Tensile strength (MPa) | 20 | 22 | 21 | 18 |
|  |  | Elongation at break (%) | 300 | 280 | 275 | 200 |
|  |  | Tensile elastic modulus (MPa) | 359 | 385 | 347 | 461 |
|  |  | tan δ | 0.068 | 0.07 | 0.069 | 0.086 |

TECHNO AES "W245" manufactured by Techno Polymer Co., Ltd. (AES resin: elastic modulus 1665 MPa)

EXELLOY "TK10" manufactured by Techno Polymer Co., Ltd. (ABS/PBT/PC resin: elastic modulus>1000 MPa)

PSJ-Polystyrene "PS680" manufactured by PS Japan Corp. (PS resin: elastic modulus>2000 MPa)

STYLAC AS "T8707" manufactured by Asahi Kasei Chemicals Corp. (AS resin: elastic modulus>2000 MPa)

STYLAC AS "769" manufactured by Asahi Kasei Chemicals Corp. (AS resin: elastic modulus>2000 MPa)

Styrene-Based Elastomer (SEBS)

TUFTEC "M1913" manufactured by Asahi Kasei Chemicals Corp. (acid-modified SEBS (compatibilizing agent): acid value 10 mg ($CH_3ONa$)/g)

TUFTEC "H1041" manufactured by Asahi Kasei Chemicals Corp. (unmodified SEBS)

Compatibilizing Agent

RESEDA "GP-301" manufactured by Toagosei Co., Ltd. (epoxy group-modified acrylic acid resin)

As can be seen from the results of Comparative Examples 1 to 4 in Table 1, it is understood that when polyamide elastomers were used singly, the loss factor (tan δ) increases along with an increase in the tensile elastic modulus. Particularly, in Comparative Examples 3 and 4 where the tensile elastic moduli were 300 MPa or higher, tan δ had very high values of 0.121 or greater.

On the contrary, as shown in Tables 2 to 6, in the Examples, while the tensile elastic moduli were approximately in the range of 200 MPa to 500 MPa, even the maximum value was 0.093. Thus, it can be seen that an increase in tan δ was suppressed while the elastic modulus was increased.

As can be seen from the results of Examples 2, 7, 10, 12, 15, 17 and 20, it is understood that even in Examples where an acid-modified polystyrene-based elastomer was added in addition to the polyamide elastomer and styrene-based resin, the elastic modulus increased while tan δ was maintained equally low, as compared with Comparative Example 2 where a polyamide elastomer was used alone. Furthermore, it is understood that in these Examples, the values of elongation at break were higher than the respective values of Examples 1, 5, 9, 11, 14, 16 and 19 where an acid-modified polystyrene-based elastomer was not included.

As can be seen from the results of Examples 3, 8, 13, 18 and 21, it is understood that even in Examples where an unmodified polystyrene-based elastomer was added in addition to the polyamide elastomer and styrene-based resin, the elastic modulus increased while tan δ was maintained equally low, as compared with Comparative Example 2 where a polyamide elastomer was used alone. Furthermore, it is understood that in these Examples, the values of elongation at break were higher than the respective values of Examples 1, 5, 9, 11, 14, 16 and 19 where an unmodified polystyrene-based elastomer was not included.

As can be seen from the results of Examples 21 to 25, it is understood that in Examples where a compatibilizing agent was added in addition to the polyamide elastomer and styrene-based resin, the elastic moduli were even higher than the Examples that did not contain a compatibilizing agent, and an increase in tan δ was markedly suppressed.

Furthermore, as can be seen from FIG. 7, it was found that in the various Examples, even if the elastic modulus was increased, the tan δ value was maintained low (the increment of tan δ is low) as compared with the various Comparative Examples.

Furthermore, the tires of Examples had low rolling resistance and had excellent heat resistance.

The disclosure of Japanese Patent Application No. 2011-030128 is incorporated herein by reference.

All publications, patent applications, and technical standards mentioned in this specification are herein incorporated by reference to the same extent as if each individual publication, patent application, or technical standard was specifically and individually indicated to be incorporated by reference.

REFERENCE SIGNS LIST 10, 200 Tire
12 Bead portion
16 Crown portion (outer circumference)
18 Bead core
20 Rim
21 Bead sheet
22 Rim flange
17 Tire case (tire frame)
24 Sealing layer (sealing portion)
26 Reinforcing cord (reinforcing cord member)
26A Cord member (reinforcing cord member)
28 Reinforcing cord layer
30 Tread
D Diameter of reinforcing cord (diameter of reinforcing cord member)
L Depth of embedding of reinforcing cord (depth of embedding of reinforcing cord member)

The invention claimed is:

1. A tire comprising at least a circular tire frame formed of a resin material,
the tire being physically different from a rim and the tire frame including a bead portion,
the resin material including a polystyrene-based resin, a polyamide-based thermoplastic elastomer including a hard segment and a soft segment in a molecule thereof, and a compatibilizing agent for the polyamide-based thermoplastic elastomer and the polystyrene-based resin, the compatibilizing agent being at least one selected from the group consisting of an epoxy group-modified (meth)acrylic resin, an acid-modified polystyrene-based thermoplastic elastomer, an amino group-modified polystyrene-based thermoplastic elastomer, an epoxy group-modified SBR, and an amino group-modified SBR, wherein the resin material does not include natural rubber,
a tensile elastic modulus of the polyamide-based thermoplastic elastomer ($E_{PAE}$) and a tensile elastic modulus of the polystyrene-based resin ($E_{PS}$) satisfying the following formula (1):

$$E_{PAE} < E_{PS}, \qquad \text{Formula (1):}$$

wherein a content ratio (x:y) of the polyamide-based thermoplastic elastomer (x) and the polystyrene-based resin (y) is from 90:10 to 55:45,
the tire includes a reinforcing cord member that is wound around an outer circumference of the tire frame in a circumferential direction to form a reinforcing cord layer, at least a part of the reinforcing cord member being embedded on the outer circumference of the tire frame in the reinforcing layer,
the tire includes a tread formed of rubber, and the tread is in direct contact with at least part of the reinforcing cord member, and
the polyamide-based thermoplastic elastomer forms a sea phase of the resin material, and the polystyrene-based resin forms an island phase of the resin material.

2. The tire according to claim 1, wherein the polystyrene-based resin is a polymer including a styrene molecular skeletal structure, or a copolymer of styrene and acrylonitrile.

3. The tire according to claim 1, wherein the polystyrene-based resin is an acrylonitrile/butadiene/styrene polymer or a hydrogenated product thereof; or a blend of an acrylonitrile/styrene copolymer and polybutadiene, or a hydrogenated product thereof.

4. The tire according to claim 1, wherein the resin material further comprises a styrene-based thermoplastic elastomer.

5. The tire according to claim 4, wherein the styrene-based thermoplastic elastomer is polystyrene-poly(ethylene/butylene) block-polystyrene.

6. The tire according to claim 1, the tire including only a layer as the reinforcing cord layer including a reinforcing cord member that is wound around in a circumferential direction.

7. The tire according to claim 1, wherein the total content of the polyamide-based thermoplastic elastomer and the polystyrene-based resin in the resin material is 50% by mass or more with respect to the total amount of the resin material.

8. The tire according to claim 1, wherein the resin material consists of the polyamide-based thermoplastic elastomer, the polystyrene-based resin, and the compatibilizing agent.

* * * * *